United States Patent [19]

Levinson

[11] 4,156,868

[45] May 29, 1979

[54] SYNTACTIC WORD RECOGNIZER

[75] Inventor: Stephen E. Levinson, Hillsborough, N.J.

[73] Assignee: Bell Telephone Laboratories, Incorporated, Murray Hill, N.J.

[21] Appl. No.: 793,954

[22] Filed: May 5, 1977

[51] Int. Cl.² .......................... G06K 9/00; G10L 1/02
[52] U.S. Cl. ..................... 340/146.3 WD; 179/1 SB; 179/1 SD
[58] Field of Search .......................... 179/1 SD, 1 SB; 340/146.3 WD, 146.3 AQ, 146.1 AB, 146.3 Q, 146.3 R, 146.3 SG

[56] References Cited

U.S. PATENT DOCUMENTS

| | | | |
|---|---|---|---|
| 3,341,814 | 9/1967 | Chow | 450/146.3 |
| 3,533,069 | 10/1970 | Garry | 340/146.3 |
| 3,675,203 | 5/1972 | Baumann | 340/146.3 AQ |
| 3,789,360 | 1/1974 | Clark | 340/146.1 AQ |
| 3,909,785 | 9/1975 | Howells | 340/146.3 SY |
| 4,003,022 | 1/1977 | Takahashi | 340/146.3 MA |
| 4,049,913 | 9/1977 | Sakoe | 179/1 SD |

OTHER PUBLICATIONS

R. Neely and G. White, "On the Use of Syntax etc.", Processing 74, North Holland Publishing Co., 1974.
S. Levinson, "The Vocal Speech Understanding System", Proc. 4th Int'l Joint Conf. on Art. Intel., U.S.S.R., 1975.
J. Baker, "The Dragon System", IRE Trans. on Ac. Sp. and S.P., Feb. 1975.

*Primary Examiner*—Leo H. Boudreau
*Attorney, Agent, or Firm*—Jack S. Cubert

[57] ABSTRACT

A syntactic analyzer recognizes a series of spoken words as one of a set of predetermined sequences of prescribed words defined by a state sequence array of state transition signals representing state linked prescribed words. Each sequence corresponds to a selected plurality of linked state transition signals ending in a final state. For each word position of the series, a set of signals representative of the acoustic correspondence between the position word and the array prescribed words is generated. A cumulative correspondence signal is produced from the array state transition signals and the correspondence signals. Upon termination of the last word position, the sequence having the closest cumulative correspondence to the spoken word series is identified.

19 Claims, 14 Drawing Figures

FIG. 4

| L | $q_P$ | $\bar{w}_j$ | $q_S$ |
|---|---|---|---|
| 1 | 1 | $\bar{w}_3$ | 2 |
| 2 | 2 | $\bar{w}_4$ | 3 |
| 3 | 3 | $\bar{w}_7$ | 4 |
| 4 | 4 | $\bar{w}_8$ | 5 |
| 5 | 5 | $\bar{w}_9$ | 6 |
| 6 | 2 | $\bar{w}_5$ | 7 |
| 7 | 7 | $\bar{w}_6$ | 3 |
| 8 | 2 | $\bar{w}_{22}$ | 22 |
| 9 | 22 | $\bar{w}_{23}$ | 23 |
| 10 | 23 | $\bar{w}_{24}$ | 24 |
| 11 | 24 | $\bar{w}_{25}$ | 6 |
| 12 | 3 | $\bar{w}_{12}$ | 15 |
| 13 | 15 | $\bar{w}_{17}$ | 16 |
| 14 | 16 | $\bar{w}_{18}$ | 17 |
| 15 | 17 | $\bar{w}_{19}$ | 5 |
| 16 | 15 | $\bar{w}_{20}$ | 18 |
| 17 | 18 | $\bar{w}_{21}$ | 6 |
| 18 | 1 | $\bar{w}_{26}$ | 8 |
| 19 | 8 | $\bar{w}_{27}$ | 9 |
| 20 | 9 | $\bar{w}_1$ | 10 |
| 21 | 10 | $\bar{w}_{15}$ | 11 |
| 22 | 11 | $\bar{w}_2$ | 6 |
| 23 | 3 | $\bar{w}_{10}$ | 12 |
| 24 | 12 | $\bar{w}_{11}$ | 13 |
| 25 | 13 | $\bar{w}_{12}$ | 14 |
| 26 | 14 | $\bar{w}_{13}$ | 5 |
| 27 | 2 | $\bar{w}_{28}$ | 3 |
| 28 | 12 | $\bar{w}_{14}$ | 19 |
| 29 | 19 | $\bar{w}_{24}$ | 20 |
| 30 | 20 | $\bar{w}_{15}$ | 21 |
| 31 | 21 | $\bar{w}_{16}$ | 6 |

FIG. 5A

| $\bar{w}_j$ \ $k$ | 1 | 2 | 3 | 4 | 5 |
|---|---|---|---|---|---|
| 1 | 9 | 9 | 1 | 8 | 4 |
| 2 | 2 | 2 | 5 | 3 | 1 |
| 3 | 7 | 3 | 2 | 3 | 2 |
| 4 | 2 | 9 | 4 | 7 | 3 |
| 5 | 1 | 5 | 4 | 8 | 2 |
| 6 | 2 | 5 | 2 | 6 | 5 |
| 7 | 2 | 1 | 9 | 8 | 3 |
| 8 | 7 | 7 | 4 | 7 | 8 |
| 9 | 2 | 3 | 2 | 4 | 9 |
| 10 | 4 | 5 | 8 | 1 | 7 |
| 11 | 6 | 3 | 9 | 8 | 5 |
| 12 | 4 | 7 | 6 | 9 | 8 |
| 13 | 3 | 6 | 7 | 8 | 9 |
| 14 | 9 | 7 | 6 | 4 | 8 |
| 15 | 8 | 6 | 5 | 2 | 3 |
| 16 | 3 | 4 | 5 | 6 | 7 |
| 17 | 8 | 6 | 8 | 7 | 5 |
| 18 | 5 | 5 | 4 | 3 | 9 |
| 19 | 9 | 9 | 8 | 7 | 3 |
| 20 | 3 | 3 | 4 | 5 | 8 |
| 21 | 9 | 8 | 3 | 5 | 6 |
| 22 | 6 | 7 | 7 | 6 | 5 |
| 23 | 4 | 4 | 4 | 4 | 3 |
| 24 | 3 | 3 | 3 | 6 | 9 |
| 25 | 5 | 4 | 3 | 7 | 6 |
| 26 | 2 | 9 | 8 | 7 | 5 |
| 27 | 6 | 2 | 8 | 4 | 9 |
| 28 | 7 | 6 | 5 | 4 | 3 |

FIG. 5B

| k+1 \ qs | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 2 |   | 1 |   |   |   |   |   | 1 |   |   |   |   |   |   |   |   |   |   |   |   |   |   |   |   |
| 3 |   |   | 2 |   |   |   | 2 | 8 |   |   |   |   |   |   |   |   |   |   |   |   |   | 2 |   |   |
| 4 |   |   | 7 | 3 |   |   |   |   | 9 |   | 3 |   |   | 3 |   |   |   |   |   |   |   |   | 22 |   |
| 5 |   |   |   | 3 | 4 |   |   |   |   | 10 | 3 | 12 |   | 3 | 15 |   | 15 | 12 |   |   |   |   |   | 23 |
| 6 |   |   |   |   | 4 | 11 |   |   |   |   | 12 | 13 |   | 15 | 16 | 15 | 12 | 19 |   |   |   |   |   |   |
| 7 |   |   |   |   |   |   |   |   |   |   |   |   |   |   |   |   |   |   |   |   |   |   |   |   |
| 8 |   |   |   |   |   |   |   |   |   |   |   |   |   |   |   |   |   |   |   |   |   |   |   |   |

FIG. 5C

| k+1 \ qs | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| 2 |   | $\bar{\omega}_3$ |   |   |   |   |   | $\bar{\omega}_{26}$ |   |   |   |   |   |   |   |   |   |   |   |   |   |   |   |   |
| 3 |   |   | $\bar{\omega}_{28}$ |   |   |   | $\bar{\omega}_5$ | $\bar{\omega}_{27}$ |   |   |   |   |   |   |   |   |   |   |   |   |   | $\bar{\omega}_{22}$ |   |   |
| 4 |   |   | $\bar{\omega}_6$ | $\bar{\omega}_7$ |   |   |   |   | $\bar{\omega}_1$ |   | $\bar{\omega}_{10}$ |   |   | $\bar{\omega}_{12}$ |   |   |   |   |   |   |   |   | $\bar{\omega}_{23}$ |   |
| 5 |   |   |   | $\bar{\omega}_7$ | $\bar{\omega}_8$ |   |   |   |   | $\bar{\omega}_{15}$ | $\bar{\omega}_{10}$ | $\bar{\omega}_{11}$ |   | $\bar{\omega}_{12}$ | $\bar{\omega}_{17}$ |   | $\bar{\omega}_{20}$ | $\bar{\omega}_{14}$ |   |   |   |   |   | $\bar{\omega}_{24}$ |
| 6 |   |   |   |   | $\bar{\omega}_8$ | $\bar{\omega}_2$ |   |   |   |   | $\bar{\omega}_{11}$ | $\bar{\omega}_{12}$ |   | $\bar{\omega}_{17}$ | $\bar{\omega}_{18}$ | $\bar{\omega}_{20}$ | $\bar{\omega}_{14}$ | $\bar{\omega}_{24}$ |   |   |   |   |   |   |
| 7 |   |   |   |   |   |   |   |   |   |   |   |   |   |   |   |   |   |   |   |   |   |   |   |   |
| 8 |   |   |   |   |   |   |   |   |   |   |   |   |   |   |   |   |   |   |   |   |   |   |   |   |

SYNTACTIC WORD RECOGNIZER

BACKGROUND OF THE INVENTION

My invention relates to pattern recognition arrangements and, more particularly, to automatic speech recognition systems incorporating syntactic analysis.

In communication, data processing and control systems, it is often desirable to use speech as direct input for inquiries, commands, data or other information. Speech input arrangements may be utilized to record information, to request information from processing equipment, or to control machine tools or other apparatus. Because of the variability of the speech signal from speaker to speaker and the variability for even a particular speaker, the degree of accuracy of speech recognition has been limited.

One type of priorly known speech recognition system receives an input speech signal and transforms the speech signal into a set of prescribed acoustic features. The set of features is compared to stored sets if previously obtained reference features corresponding to the possible words to be recognized. When the prescribed features of the input speech signal correspond to a particular set of reference features in accordance with predetermined criteria, the word associated with the corresponding set of reference features is identified as the input speech signal. It is readily seen that the reliability of the recognition system is highly dependent on the selected features and on the prescribed recognition criteria. Where the reference features and the features of the input speech signal are obtained from the same speaker and the word to be recognized is spoken in isolation, the recognition system is relatively simple and its accuracy is improved.

The accuracy of recognition of a series of spoken words can be further improved by resorting to various non-acoustic sources of information, such as syntax or semantics, to detect and correct inaccuracies in the acoustical recognition of single words on the basis of prescribed rules governing the relationship among the acoustically recognized words in the series. For example, a series of acoustically recognized words may be compared to each of a set of previously stored allowable sequences of reference words. In this manner, impermissible sequences can be discarded and permissible sequences similar to the combination of acoustically recognized words can be detected. Such an arrangement requires an exhaustive search of all syntactically or semantically allowable sequences. It is known, however, that even a limited series of words results in a large set of allowable sequences and that the number of allowable sequences increases exponentially with the number of words in the series. Therefore, an exhaustive search through the store of all allowable sequences of reference words to find the allowable sequence with the closest correspondence to the series of acoustically recognized words is impractical.

The article, "On the Use of Syntax in a Low-Cost Real Time Speech Recognition System," by Richard B. Neely and George M. White, appearing in *Information Processing* 74, published by North Holland Publishing Co., 1974, describes a selective syntax recognition technique in which an heuristic search in made through lists of acoustically recognized candidate words to select a sequence of candidate words that conform to prescribed word juxtaposition rules and are acoustically likely. Once a syntactically correct and acoustically likely sequence is found, it is identified as the series of spoken words. Other allowable acoustically likely sequences for the series of spoken words, however, are ignored.

Another syntactic analysis arrangement described in the article, "The Vocal Speech Understanding System," by S. E. Levinson, appearing in Proceedings of 4th International Joint Conference on Artificial Intelligence, Tbilisi, U.S.S.R., September 1975, discloses a speech understanding system which tests an acoustically recognized input word sequence to determine whether it conforms a prescribed syntactic rules and utilizes semantic analysis of unsuccessful sequences to correct words in the acoustically recognized sequence which corrections force the sequence to follow the syntactic rules. Since the semantic analysis is heuristic, several syntactically correct candidate sentences may be generated. The candidate sentence conforming to the syntactic and semantic restraints which is most similar to the acoustically recognized sequence is identified as the input word sequence. While the identifying sequence is selected from a plurality of heuristically formed sequences, other equally likely sequences are ignored.

BRIEF SUMMARY OF THE INVENTION

The invention is directed to an arrangement for recognizing a series of symbols in which a state sequence array of state transition signals each including an initial state, a terminal state, and a prescribed symbol linking said initial and terminal states defines a set of predetermined sequences of prescribed symbols. Each sequence corresponds to a selected plurality of state linked state transition signals ending in a final state defining the end point of the sequence. For each symbol position of the series, a set of signals representative of the correspondence between the position symbol and the prescribed symbols of the array is generated. A cumulative correspondence signal for each sequence is formed responsive to the set of state transition signals and the correspondence signals. Upon termination of the last position in the series, the sequence in its final state having the closest cumulative correspondence with the series of symbols is identified responsive to the cumulative correspondence signals for the sequences in their final states.

According to one aspect of the invention, a time interval is assigned to each symbol position after the correspondence signals are generated. In each position interval, a cumulative correspondence signal is formed for each sequence responsive to the state transition signals and the set of correspondence signals. Upon termination of the last position interval, the sequence in its final state having the minimum last position cumulative correspondence signal is identified as the series of symbols.

According to yet another aspect of the invention, in each position interval, the position correspondence signal associated with each sequence state transition signal prescribed symbol is selected responsive to each sequence state transition signal. The sequence word position selected correspondence signal is combined with the preceding position selected correspondence signals of the sequence to form the sequence cumulative correspondence signal.

According to yet another aspect of the invention, in each position interval, the prescribed symbol of each position sequence state transition signal is stored. Upon termination of the last position interval, the sequence in its final state having the minimum last position cumulative correspondence signal is identified and the sequence corresponding to the identified final state is formed from the stored prescribed symbols of said sequence.

According to yet another aspect of the invention, the series of symbols is a series of words and each sequence of prescribed symbols a sequence of prescribed words.

According to yet another aspect of the invention, the series of words is a series of spoken words and the set of correspondence signals generated for each word position of the series comprises the set of signals representative of the acoustic correspondence between the spoken word of the position and the prescribed words of the array.

According to yet another aspect of the invention, the state sequence array comprises a start state, a plurality of final states and a plurality of intermediate states. Pairs of states are selectively linked by prescribed words. Each predetermined sequence is represented by a sequence of prescribed words which are connected by a predetermined set of states. Every sequence beginning point is a common start state, and each sequence terminates in a final state which defines the end of the sequence. The set of state connected prescribed word signals used in each word position comprises the set of all state connected prescribed words forming the state sequence array.

According to yet another aspect of the invention, the cumulative correspondence signal of each predetermined sequence is formed for each word position and is stored. Upon termination of the last word position of the series, the cumulative correspondence signals of the predetermined sequences in their final states are compared and the predetermined sequence with the minimum cumulative correspondence signal is selected as the spoken word series.

According to yet another aspect of the invention, the prescribed word associated with each predetermined sequence selected correspondence signal and the initial state associated with said sequence prescribed words are stored for each word position. Upon identification of the closest corresponding sequence termination of the last word position, the final state of the closest corresponding sequence is obtained and the closest corresponding predetermined sequence is formed from the stored prescribed words of the closest corresponding sequence addressed in accordance with the stored initial states.

In an embodiment illustrative of the invention, a series of spoken words is applied to an acoustic word recognizer which compares the acoustic features of each spoken word to the stored features of the set of prescribed words and generates a set of signals representative of the correspondence of the spoken word to each prescribed word.

Each correspondence signal is a measure of the degree of similarity between the spoken word feature signals and the stored feature signals of the prescribed word. The set of correspondence signals for each word position is stored in a word position ordered store. A state sequence array represents all predetermined sequences of prescribed words as a directed graph wherein the prescribed words (edges) are connected by an ordered set of states (vertices). Each state is a labeled connection point between prescribed words. The state sequence array is permanently stored as a set of state transition signals. Each state transition signal includes an initial state code, a prescribed word code, and a terminal state code. The initial state connects the prescribed word to preceding prescribed words and the terminal state connects the prescribed word to succeeding prescribed words. If the terminal state code of one state transition signal is identical to the initial state code of another state transition signal, the prescribed words of these signals are connected and are part of a predetermined sequence. Each predetermined sequence is formed by a plurality of state connected state transition signals and ends in a final state which is the terminal state of the last prescribed word of the sequence. All predetermined sequences begin in a common starting state which is the initial state of the first prescribed word of every sequence.

In an interval assigned to the first word position, the state transition signals are sequentially generated by the state sequence array memory. Responsive to each state transition signal whose initial state is the starting state, the correspondence signal relating the features of position spoken word to the features of the state transition signal prescribed word is selected as the cumulative correspondence signal for the first word of the sequence defined by the state transition signal. The state transition signal prescribed word is stored as addressed by first word position and state transition signal terminal state. The cumulative correspondence signal is stored as addressed by the state transition signal terminal state.

In each succeeding word position interval, the state transition signals are sequentially generated by the state sequence array memory. Responsive to each state transition signal, the correspondence signal associated with said state transition signal prescribed word is selected and is added to the cumulative correspondence signal of the preceding word position of the sequence. The cumulative correspondence for the sequence at each word position is the sum of the selected correspondence signals for the prescribed words of the predetermined sequence for the prior and present word positions. The cumulative correspondence signal for the present word position is stored as addressed by the state terminal state. The state transition signal initial state and prescribed word are stored as addressed by the word position and the state transition signal terminal state.

Upon termination of the last spoken word position, the cumulative correspondence signals of the predetermined sequences in their final states are compared; and the final state of the minimum cumulative correspondence signal sequence is selected. The stored prescribed words of the predetermined sequence in its final state having the minimum cumulative correspondence signal are sequentially retrieved in accordance with the selected final state and the stored initial states of the predetermined sequence. The retrieved sequence of prescribed words is identified as the spoken word series.

BRIEF DESCRIPTION OF THE DRAWING

FIG. 4 shows the arrangement of the state sequence array shown in FIGS. 1 and 2;

FIG. 5A shows the arrangement of the correspondence store of FIGS. 1 and 2;

FIG. 5B shows the arrangement of the selected state sequence store of FIG. 2;

FIG. 5C shows the arrangement of the selected word sequence store of FIG. 2.

THEORETICAL CONSIDERATIONS

Figure 1:
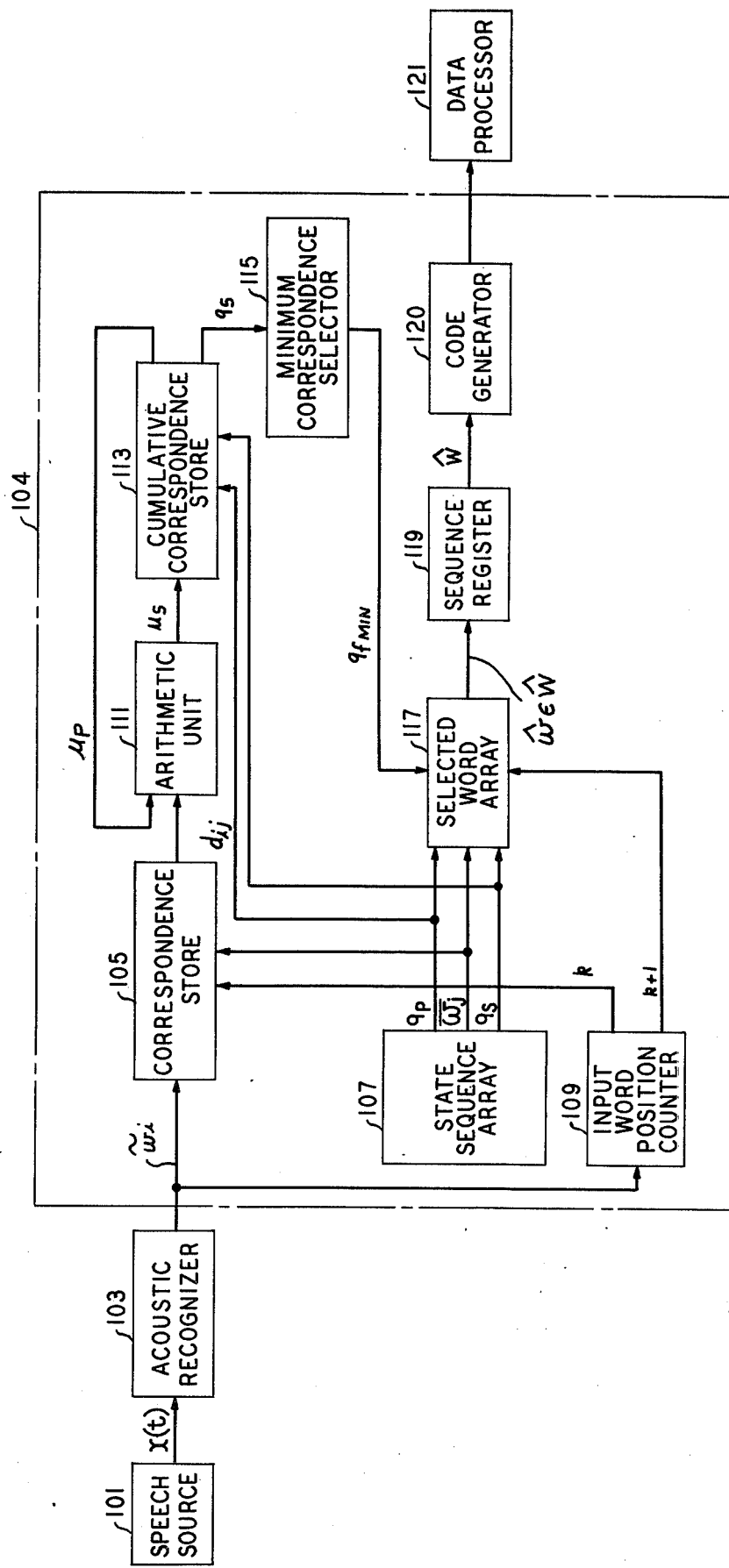
FIG. 1 depicts a general block diagram of a syntactic word recognizer illustrative of the invention.

In speech recognition systems, a series of spoken words $$W = w_1, w_2, -, w_i -, w_n \quad w_i \epsilon V_T \text{ for } 1 \leq i \leq n \quad (1)$$

(where $V_T$ is a set of prescribed words of a predetermined vocabulary) are transformed into a speech signal x(t). Responsive to speech signal x(t), an acoustic recognizer produces a series of words $$\widetilde{W} = \widetilde{w}_1, \widetilde{w}_2, \ldots, \widetilde{w}_i, \ldots, \widetilde{w}_n \quad (2)$$

some or all of which may be corrupted and a set of signals $d_{ij}$ indicative of the correspondence between words $\widetilde{w}_i$ and prescribed words $\overline{w}_j \epsilon V_T$ for $1 \leq i \leq n$ and $1 \leq j \leq V_T$. Syntactic analysis is responsive to, (a) the $d_{ij}$ signals and (b) a state sequence array defining a set of allowable predetermined sequences of prescribed words $\overline{w}_j$, to form a sentence $\hat{W}$ which is an allowable sentence in a formal language L(G) i.e., $\hat{W} \epsilon L(G)$. L(G) is generated by a formal grammar $G(V_N, V_T, S, P)$ where $V_T$ are prescribed words of a predetermined vocabulary; $V_N$ is a set of abstract symbols with $V_N \Omega V_T = \phi$; S is a start symbol; and P is a set of production rules of the form P: $\alpha\beta$; $\alpha,\beta\epsilon\{V_N U V_T\}^*$ and $\{A\}^*$ signifies the set of all sets whose elements are members of set A. $\hat{W}\epsilon L(G)$ is an allowable predetermined sequence which exhibits in closest correspondence to W in accordance with $$D(\hat{W}) = \min \{ \sum_{i=1}^{n} d_{ij_i} \} \quad 1 \leq j_i \leq V_T, 1 \leq i \leq n \quad (3)$$

In accordance with the invention, $\hat{W}$ is generated by means of a state sequence array which array defines a finite set of states, Q, and a finite set of permissible state transitions $\delta$. If the array is in state $q_i\epsilon Q$ and the present input word is $\widetilde{w}_j\epsilon V_T$, then $\delta(q_i,\widetilde{w}_j) = q_k$, and the transition is made from state $q_i$ to state $q_k\epsilon Q$. If no such $\delta$ exists for $\widetilde{w}_j$, then the sentence $\hat{W}$ containing $\widetilde{w}_j$ is not a member of L(G). The starting state $q_1$ corresponds to the start symbol S of G. A set of states Z ⊂ Q is the set of final states $q_f$ at which a sentence $\hat{W}$ terminates if $\hat{W}\epsilon L(G)$. The correspondence between $\hat{W}$ and $\widetilde{W}$ is developed by forming cumulative correspondence signals for the linked states of the state sequence array and storing the words associated with the state transitions.

Initially, the cumulative correspondence is set to $$\phi_i(q) = \begin{cases} 0 \text{ if } q = q_1 \text{ and } i = 0 \\ \text{otherwise } \infty \text{ for all } q\epsilon Q \end{cases} \quad (4)$$

and the linking word store is set to $$\Psi_i(q) = \Lambda \text{ for all } q\epsilon Q \text{ and } 1 \leq i \leq n \quad (5)$$

where $\Lambda$ is the null symbol. After scanning the ith input word, the correspondence store is set to cumulative correspondence $$\phi_i(q_s) = \Delta \min\{\phi_{i-1}(q_p) + d_{ij}\} \quad (6)$$

where $\Delta = \{\delta(q_p,\overline{w}_j) = q_s\}\overline{w}_j\epsilon V_T$, $q_p$ is the initial state, $q_s$ is the terminal state and $d_{ij}$ is the correspondence signal relating $\widetilde{w}_i$ and $\overline{w}_j$ and the linking word store is set to $$\psi_i(q_s) = \psi_{i-1}(q_s)\hat{w}_j \text{ for all } q_s\epsilon Q. \quad (7)$$

where $\hat{w}_j$ is the $\overline{w}_j$ which minimizes $\phi_i(q_s)$.

After scanning the last (nth) input word, the closest corresponding predetermined sequence $$\hat{W} = \hat{w}_1, \hat{w}_2, \ldots \hat{w}_n \text{ is } \psi_n(q) \quad (8)$$

such that $\phi_n(q)$ is minimal for all $q\epsilon Z$ where Z is the set of final states. $\phi_n(q)$ is the cumulative correspondence of the predetermined sequence $\hat{W}$ which most closely corresponds to $\widetilde{W}$. Thus, even though, some or all of spoken words $\widetilde{w}_i$ of the acoustically recognized series are corrupted, the errors are corrected by syntactic analysis which selects the closest corresponding sequence $\hat{W}$ of the set of allowable predetermined sequences defined by the state sequence array.

DETAILED DESCRIPTION

FIG. 1 shows a general block diagram of a syntactic word recognizer illustrative of the invention in which a speech signal x(t) is obtained from speech source 101. Signal x(t) corresponds to the series of spoken words of equation 1 generated in speech source 101. The word recognizer of FIG. 1 comprises acoustic recognizer 103 which is responsive to the signal x(t) to provide a set of correspondence signals representative of the similarity of each input word to a set of vocabulary words. The output correspondence signals from acoustic recognizer 103 are applied to syntactic analyzer 104. Analyzer 104 is jointly responsive to the correspondence signals from acoustic recognizer 103 and a stored state sequence array defining the set of syntactically allowable sequences of prescribed words to identify the predetermined sequence of the array which most closely corresponds to the input spoken word series. After the closest corresponding predetermined sequence is identified, a code representative of said sequence is applied to data processor 121 as a control signal. In this manner, an input series of spoken words is accurately converted into one of a set of predetermined control signals without the need for operator interpretation or manual conversion of the spoken input word series to machine usable form.

Acoustic recognizer 103 includes a stored set of previously obtained feature signals for prescribed words which form a vocabulary of words $\overline{w}_j$. For each input word $w_i$, x(t) is transformed into a predetermined set of feature signals representing $\widetilde{w}_i$. The feature signals for $\widetilde{w}_i$ are compared to the feature signals of each vocabulary word $\overline{w}_j$ $1 \leq j \leq V_T$. Responsive to the comparison of $\widetilde{w}_i$ and the set of vocabulary words $\overline{w}_j$, a set of correspondence signals $d_{ij}$ is produced. Each $d_{ij}$ signal is a measure of the similarities between the feature signals of a word position input word $\widetilde{w}_i$ and the stored feature signals of prescribed word $\overline{w}_j$. $d_{ij}$ may, for example, be a metric signal representative of the distance between the feature signal vectors for word $\widetilde{w}_i$ and the stored feature signal vectors for $\overline{w}_j$. Thus, for every word position input word $\widetilde{w}_i$, a set of $V_T$ $d_{ij}$ signals is obtained. The word recognition process could be terminated by selecting the closest conforming vocabulary word $\overline{w}_j$ for each word $\widetilde{w}_i$ so that a coded signal representative of the input word series is produced. It has been found, however, that errors in one or more of $\tilde{w}_i$ occur, and that such errors can cause the coded signal $\tilde{W}$ to be unintelligible and, therefore, unusable for control purposes.

In the circuit of FIG. 1 the correspondence signals $d_{ij}$ generated in acoustic recognizer 103 are applied to and stored in correspondence store 105 of syntactic analyzer 104 as addressed by word position and vocabulary word codes obtained from recognizer 103. Syntactic analyzer 104 includes state sequence array 107, which array comprises a read only memory permanently storing a set of state transition signals. The state transition signal set defines the allowable predetermined sequences of prescribed words $\overline{w}_j$. Each state transition signal includes a code $q_p$ for the initial state of the signal, a code $q_s$ for the terminal state of the signal, and a code $\overline{w}_j$ representative of the prescribed word connected by states $q_p$ and $q_s$. The states are connection point between prescribed words labeled to define the predetermined sequences of prescribed words. Every sequence begins with a common starting state $q_1$. Each sequence includes a plurality of intermediate states $\{q_n\}$ and a final state $q_f$ identifying the end of the sequence. Thus, a sequence $\overline{W} = \overline{w}_1, \overline{w}_2, \ldots \overline{w}_{n-1}, \overline{w}_n$ could be represented by the state transition signals $q_1, \overline{w}_1, q_2; q_2, \overline{w}_2, q_3; \ldots; q_{n-1}, \overline{w}_{n-1}, q_n; q_n, \overline{w}_n, q_f$. $q_1$ is the starting state of the sequence and the initial state of the first station transition signal $q_1, \overline{w}_1, q_2$. Terminal state $q_2$ of $q_1, \overline{w}_1, q_2$ serves as a connection point to the next state transition signal $q_2, \overline{w}_2, q_3$ whose initial state is also $q_2$. Similarly, terminal state $q_n$ of transition signal $q_{n-1}, \overline{w}_{n-1}, q_n$ is the connection point to state transition signal $q_n, \overline{w}_n, q_f$ whose initial state is also $q_n$. Since $\overline{w}_n$ is the last prescribed word of the sequence, its terminal state is the final state $q_f$ which identifies the end of sequence $\overline{W}$.

Cumulative correspondence register 113 includes a first section which stores the cumulative correspondence signals $\phi_p$ for the initiating states $q_p$ at the beginning of each word position designated by word counter 109, and a second section which stores the cumulative correspondence signals $\phi_s$ at the end of the word position. Initially, the common starting state position of the $q_p$ section of register 113 ($q_1$) is set to 0, and all other state positions are set to $\infty$ represented by the largest possible number (LPN) allowed in register 113 in accordance with equation 4. All state positions of the $q_s$ section of register 113 are set to LPN.

Responsive to the sequence of state transition signals, $q_p, \overline{w}_j, q_s$ from state sequence array 107 in each word position, the present state $q_p$ cumulative correspondence signal $\phi_p$ is applied to one input of arithmetic unit 111 and the $d_{ij}$ correspondence signal of the word position associated with $\overline{w}_j$ from array 107 is applied from store 105 to the other input of arithmetic unit 111. $\phi_p$ from the $q_p$ section of register 113 is added to the $d_{ij}$ from store 105. The result from arithmetic unit 111 is entered into the $q_s$ section of register 113 as addressed by the terminating state $q_s$ from array 107 if the sum from arithmetic unit 113 is less than the cumulative correspondence signal $\phi_s$ in the $q_s$ section of register 113. When $\phi_p$ is LPN, there is no predetermined sequence corresponding to $q_p, \overline{w}_j, q_s$.

When a new cumulative correspondence signal $\phi_s = \phi_p + d_{ij}$ signal is entered in the $q_s$ section of register 113, the prescribed word $\overline{w}_j$ and the $q_p$ state from array 107 are entered into selected word array 117 as jointly addressed by the word position designation in word counter 109 and the terminating state $q_s$ obtained from array 107. In this manner, the cumulative correspondence signal for each predetermined sequence is stored in register 113 for each successive word position and the associated prescribed word $\overline{w}_j$ for each finite valued syntactically allowable sequence is stored in selected word array 117 according to the word position.

Upon termination of the last word position, indicated by the last state of word counter 109, the cumulative correspondence signals for the final states $q_f$ of the sequences defined by array 107 are applied from register 113 to minimum correspondence selector circuit 115 which is operative to select the final state $q_{fmin}$ associated with the minimum cumulative correspondence signal, $\phi_{min}$. $q_{fmin}$ addresses selected word array 117 to transfer the last word, $\hat{w}_n$, of the selected sequence to selected sequence register 119. Selected word array 117 also stores the initiating state $q_p$ associated with the minimum final state $q_{fmin}$. The $q_p$ state associated with $q_{fmin}$ is then retrieved from array 117 to address the next lower word position set in array 117 so that the next lower prescribed word of the selected sequence ($\hat{w}_{n-1}$) is transferred to register 119. In this manner, register 119 is sequentially filled with the allowable sequence $\hat{W} = \hat{w}_n, \hat{w}_{n-1}, \ldots, \hat{w}_1$ having the closest correspondence to the word series $\tilde{W}$. Responsive to $\hat{W}$ from register 119 after it is filled, code generator 120 produces a corresponding code which is transferred to data processor 121 as a control signal so that processor 121 may be operated responsive to the recognized sequence $\hat{W}$.

Figure 2A:
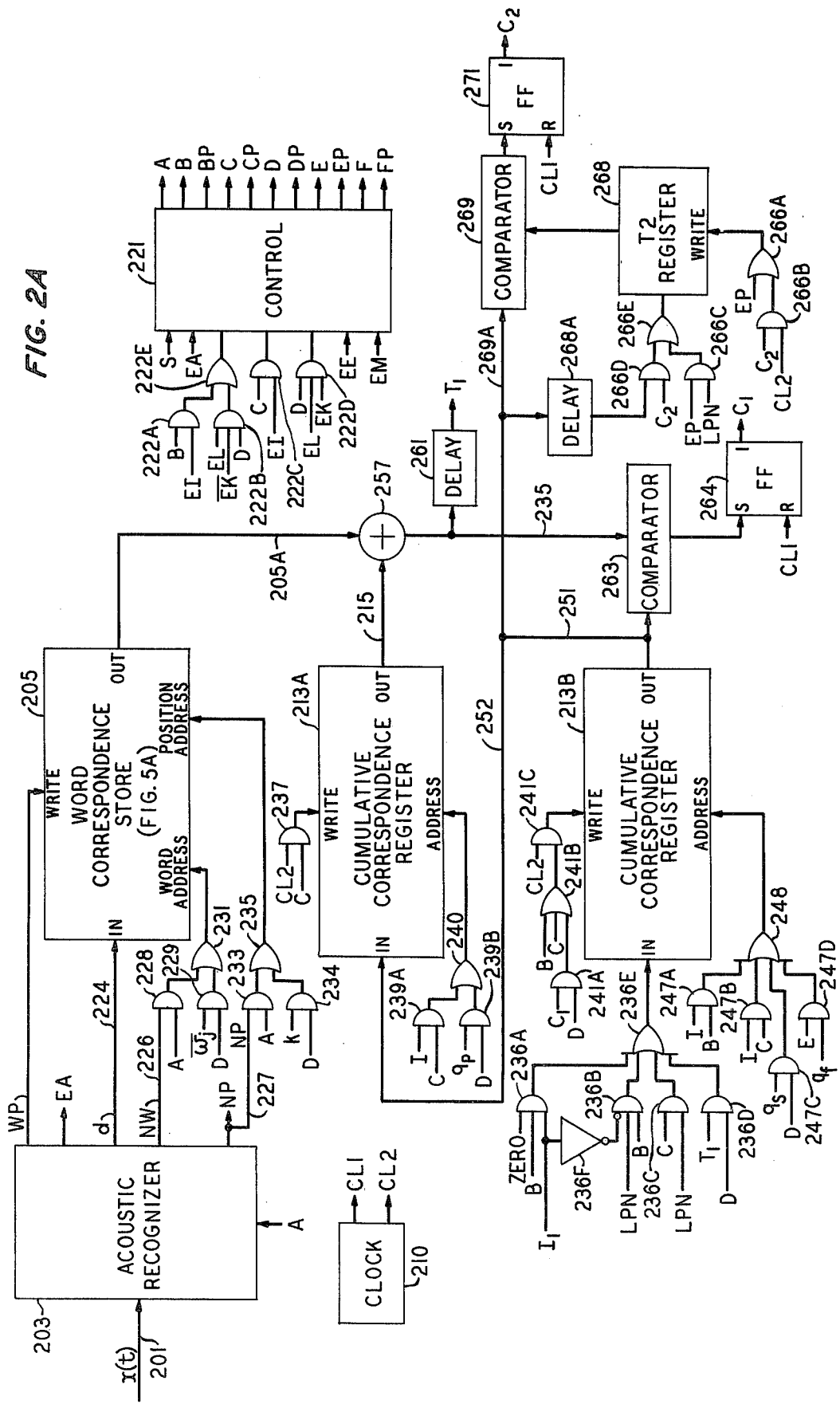
FIGS. 2A and 2B depict a detailed block diagram of the syntactic word recognizer of FIG. 1.
Figure 2B:
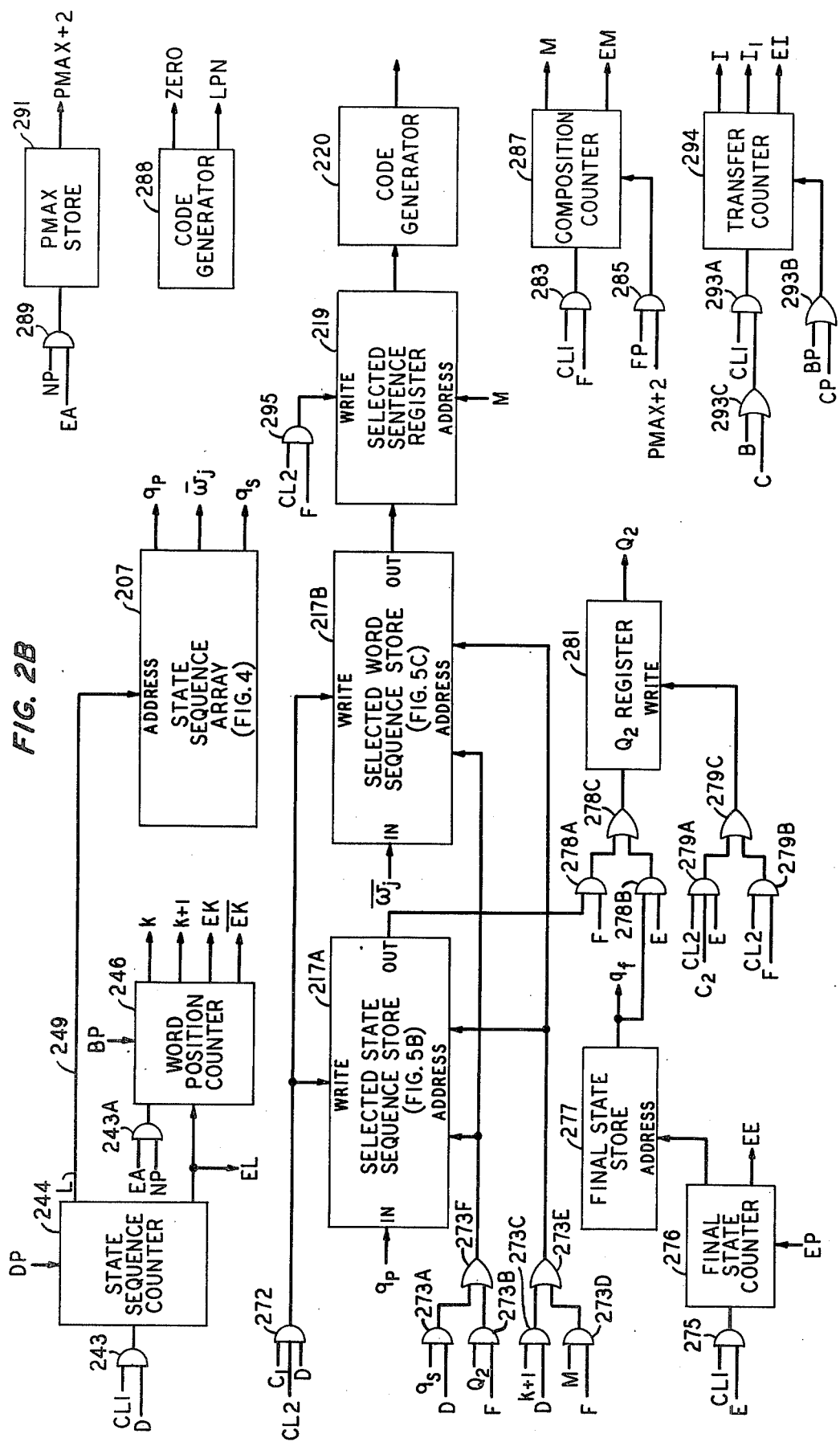

FIGS. 2A and 2B show a detailed block diagram of the syntactic word recognition system of FIG. 1. During syntactic word recognition, the system of FIGS. 2A and 2B first operates in an acoustic recognition mode under control of control signal A shown in waveform 601 of FIG. 6. In the recognition mode, a set of correspondence signals d are formed in acoustic recognizer 203 of FIG. 2A responsive to speech signal x(t) for each spoken word applied thereto. Correspondence signals are transferred to and stored in word correspondence store 205 of FIG. 2A as addressed by word position and prescribed word code specified by recognizer 203.

Figure 6:
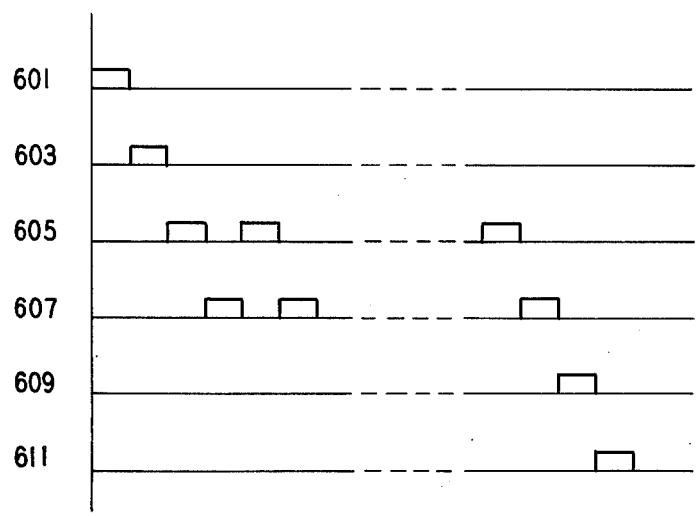
FIGS. 6 through 11 show waveforms useful in illustrating the operation of the syntactic word recognizer of FIGS. 1 and 2.

After the d signals are stored for the last spoken word of the series, the system of FIGS. 2A and 2B is placed in its initialization mode under control of control signals B and C shown in waveforms 603 and 605 of FIG. 6 to set cumulative correspondence registers 213A and 213B (FIG. 2A) to their initial states. During the B signal cycle of the initialization mode, register 213B is initialized. In the C signal cycle of the initialization mode, the contents of register 213B are transferred to register 213A and register 213B is reinitialized. At the end of the initialization mode, the starting state position ($q_1$) of register 213A is set to 0. $q_1$ corresponds to the common starting state of all predetermined sequences. The other state positions of register 213A and all positions of register 213B are set to the largest possible number (LPN) codes.

Upon completion of the initialization of cumulative correspondence registers 213A and 213B, the word recognition system is advanced to the state sequence mode by disabling control signal C and enabling control signal D shown in waveform 607 in FIG. 6. In response to signal D, the cumulative correspondence signals for each word position are successively generated in the arithmetic unit comprising adder 257, comparator 263 and flip-flop 264 (FIG. 2A) from the previous word position cumulative correspondence signals $\phi_p$ in register 213A and the correspondence signals d for the word position in store 205 (FIG. 2A) as addressed by the $q_p$ and the $\bar{w}_j$ words from state sequence array 207 of FIG. 2B. The resulting cumulative correspondence signals from adder 257 (FIG. 2A) are stored in register 213B as addressed by the $q_s$ word from array 207 (FIG. 2B) when the resulting correspondence signal is less than the value of the $\phi_s$ code previously in register 213B. In that event, the prescribed word code $\bar{w}_j$ from array 207 is stored in selected word sequence array 217B of FIG. 2B as addressed by the $q_s$ code from array 207 and the word position code k+1 from word position counter 246 of FIG. 2B. After the formation of the last $\phi_s$ signal under control of state sequence array 207, the contents of register 213A are transferred to register 213A and all state positions of register 213B are reset to LPN under control fo control signal C. Control signals D and C are alternately enabled for each word position interval. In the last word position interval, only signal D is applied.

Upon termination of the last word position interval, the cumulative correspondence signals $\phi_s$ for the sequences defined by state sequence array 207 are stored in register 213B. All other positions of register 213B contain the LPN codes. The recognition system is then placed in its selection mode by disabling signal D and enabling control signal E shown in waveform 609 of FIG. 6. During the selection mode, store 213B is addressed by final state store 277 of FIG. 2B so that the $\phi_s$ signals of the final states $\{q_f\}$ are read from store 213B in sequence. The final state cumulative correspondence signals $\phi_s$ are applied to the minimum signal selector comprising $T_2$ register 268, comparator 269, flip-flop 271 of FIG. 2A and register 281 of FIG. 2B. At the end of the selection mode, the final state ($q_{fmin}$) corresponding to the selected minimum cumulative correspondence signal from register 213B (FIG. 2A) is placed in register 281 (FIG. 2B) and the sequence formation mode is initiated by disabling signal E and enabling control signal F shown in waveform 611 of FIG. 6.

In the sequence formation mode, the prescribed words of the selected sequence in store 217B (FIG. 2B) are sequentially addressed by word position in reverse order (n, n−1, ..., 1). First $\hat{w}_n$ is read from array 217B as addressed by state $q_{fmin}=Q_2$. Concurrently, the $q_p$ state associated with $q_{fmin}=Q_2$ previously stored in array 217A (FIG. 2B) is placed in register 281 so that the selected $\hat{w}_{n-1}$ prescribed word is transferred next from array 217B to selected sentence register 219 of FIG. 2B. In this manner, the sequence $\hat{W}=\hat{w}_n,\hat{w}_{n-1},—,\hat{w}_1$ is obtained from array 217B (FIG. 2B). Code generator 220 of FIG. 2B then provides a code corresponding to $\hat{W}$ as a control signal for a utilization device such as data processor 121. Control signal F is disabled and the formation mode is terminated.

The system of FIGS. 2A and 2B may be used in any processing or control system where automatic recognition is employed. While described in terms of acoustic word recognition, the system is applicable to pattern recognition for words, abstract symbols, or physical objects. For purposes of illustration, the operation of the system of FIGS. 2A and 2B is described with reference to an airline reservation arrangement in which a customer is permitted to orally request airline scheduling or other related information, or to orally make, change, or confirm reservations. It has been found that a vocabulary of 127 prescribed words is sufficient to define customer inputs where requests are limited to 10 geographical locations, and that requests in the form of sentences of up to 22 words are adequate to define each possible customer input. There are approximately $6.08 \times 10^9$ sentences of up to 22 words that are meaningful in the context of airline reservation information. For the 127 words vocabulary, the state sequence array defining these sentences has 144 states. While the system of FIGS. 2A and 2B can be adapted to accommodate the aforementioned airlines reservation arrangement, it is herein disclosed in terms of more limited set of sentences defined by the state sequence array illustrated by the network of FIG. 3 for purposes of greater simplicity of description. This network shows a subset of selected 4, 5, 6 and 7 word sentences using a 28 word vocabulary and 24 states.

Figure 3:
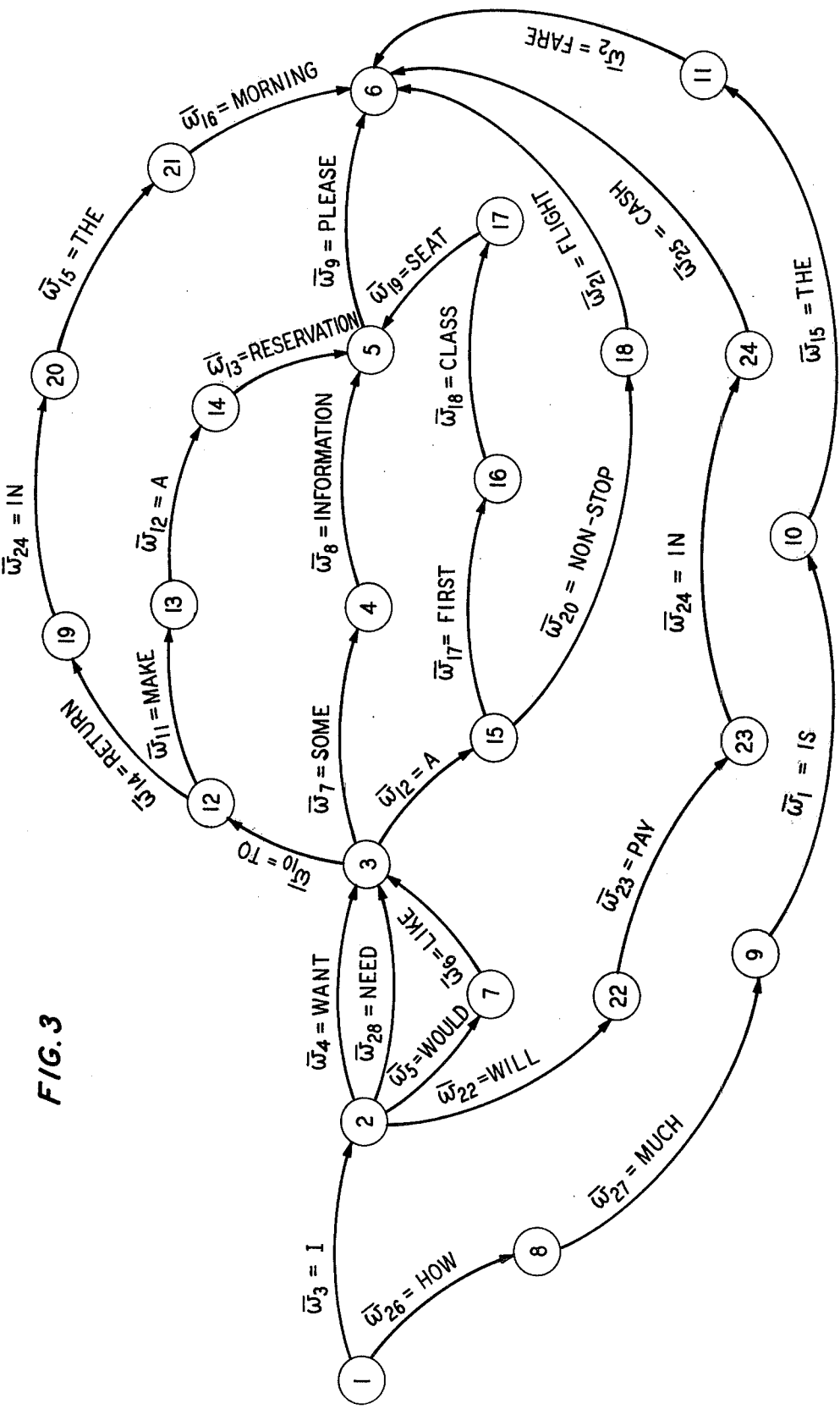
FIG. 3 shows a schematic diagram of a state sequence network useful in illustrating the syntactic recognizer of FIG. 2.

In FIG. 3, the states of the state sequence array are shown in encircled numbers, each number representing the state designation. The states are a connection point between prescribed words which designate the predetermined sequences. The lines linking these states define the prescribed words between the states. For example, states 1 and 2 are linked by the word $\bar{w}_3=$"I". The predetermined sequence, "I want some information please" is defined by states 1, 2, 3, 4, 5 and 6 linked by the prescribed word sequence $\bar{w}_3=$I, $\bar{w}_4=$want, $\bar{w}_7=$some, $\bar{w}_8=$information, $\bar{w}_9=$please, respectively, and the sequence, "How much is the fare" is defined by states 1, 8, 9, 10, 11 and 6, appropriately linked by $\bar{w}_{26}=$How, $\bar{w}_{27}=$much, $\bar{w}_1=$is, $\bar{w}_{15}=$the, and $\bar{w}_2=$fare. State 1 is the starting state $q_1$ of the network of FIG. 3 and is the common starting state of all sequences. States 5 and 6 are the final states, $\{q_f\}$, of the network since each sequence or sentence, ends in either state 5 or state 6. The other states shown in FIG. 3 are intermediate states. The vocabulary of prescribed words in state sequence network of FIG. 3 and the codes $\bar{w}_j$ representing the prescribed words in FIG. 3 are shown in Table 1.

TABLE 1

| CODE | PRESCRIBED WORD |
|---|---|
| $\bar{w}_1$ | IS |
| $\bar{w}_2$ | FARE |
| $\bar{w}_3$ | I |
| $\bar{w}_4$ | WANT |
| $\bar{w}_5$ | WOULD |
| $\bar{w}_6$ | LIKE |
| $\bar{w}_7$ | SOME |
| $\bar{w}_8$ | INFORMATION |
| $\bar{w}_9$ | PLEASE |
| $\bar{w}_{10}$ | TO |
| $\bar{w}_{11}$ | MAKE |
| $\bar{w}_{12}$ | A |
| $\bar{w}_{13}$ | RESERVATION |
| $\bar{w}_{14}$ | RETURN |
| $\bar{w}_{15}$ | THE |
| $\bar{w}_{16}$ | MORNING |
| $\bar{w}_{17}$ | FIRST |
| $\bar{w}_{18}$ | CLASS |
| $\bar{w}_{19}$ | SEAT |
| $\bar{w}_{20}$ | NON-STOP |
| $\bar{w}_{21}$ | FLIGHT |
| $\bar{w}_{22}$ | WILL |
| $\bar{w}_{23}$ | PAY |
| $\bar{w}_{24}$ | IN |
| $\bar{w}_{25}$ | CASH |
| $\bar{w}_{26}$ | HOW |
| $\bar{w}_{27}$ | MUCH |
| $\bar{w}_{28}$ | NEED |

State sequence array 207 of FIG. 2B comprises a read only memory (ROM) well known in the art in which are stored a sequence of signals in the form, L, $q_p$, $\bar{w}_j$, $q_s$.

Where L represents the address of the signal in array 207, $q_p$ is a coded signal stored in the ROM of state sequence array 207 which represents the initial state of the signal. $q_s$ is a coded signal stored in the ROM of state sequence array 207 which represents the terminating state of the signal, and $w_j$ is a coded signal stored in the ROM of state sequence array 207 which represents the prescribed word linking $q_p$ and $q_s$. Array 207 is shown in FIG. 4. As illustrated in FIG. 4, the signal 1, $\bar{w}_3$, 2 is stored in position L=1. This signal corresponds to the prescribed word "I" linking states 1 and 2 in the network of FIG. 3. Similarly, the signal 24, $\bar{w}_{25}$, 6 representing the prescribed word "cash" linking states 24 and 6 in FIG. 3 is found in position L=11. For each word position of the spoken word series, the sequence of signals L=1 through L=31 is obtained from state sequence array 207 to define the set of state transition signals of predetermined sequences shown in the netword of FIG. 3 for that word position. All state transition signals of FIG. 4 are applied in each word position.

Referring to FIGS. 2A and 2B, an external control pulse S is applied to control 221 of FIG. 2A when a speech signal x(t) is to be applied to line 201 (FIG. 2A) from a speech source such as a telephone line or a microphone (not shown). In response to signal S, control 221 (FIG. 2A) generates control signal A to initiate the acoustic recognition mode. Signal A activates acoustic recognizer 203 which is operative to produce a set of correspondence signals d for each input word position. Recognizer 203 may comprise any of the well known acoustic word recognizers adapted to provide signals indicative of the acoustic similarity between an input word and the set of prescribed vocabulary words. One such arrangement is described in the article, "Minimum Predictive Residual Principle Applied to Speech Recognition," by F. Itakura, appearing in the IEEE Transaction on Acoustics, Speech and Signal Processing, Vol. 23, pp. 67–72, February 1975.

In the Itakura arrangement, reference linear prediction derived signals are stored for prescribed words spoken by a designated individual. When an unknown word is later uttered by the designated individual, the linear prediction derived signal obtained therefrom is compared to the reference word derived signals by means of a distance metric and the closest corresponding reference word is identified as the unknown word. As used in the circuit of FIGS. 2A and 2B, such an acoustic recognizer provides a set of correspondence signals d for each input word position of the series, an address signal NP corresponding to the spoken word position in the series of input words, an address signal NW corresponding to the reference prescribed word and a write pulse WP at the time the d signal for the particular NP, NW address is available from the recognizer.

In FIG. 2A, the NP signals are applied to AND gate 233 and the NW signals are applied to AND gate 228. During the recognition mode, signal A enables gates 228 and 233 so that the NW signal is applied to the word address input of random access word correspondence store 205 (FIG. 2A) via AND gate 228 and OR gate 231, and the NP signal is applied to the position address input of store 205 via AND gate 233 and OR gate 235. Upon the occurrence of write pulse WP, and d signal from recognizer 203 is inserted into the position of store 205 addressed by signals NP and NW. For an input word series of 5 words and the 28 prescribed words of Table 1, NP is initially set to 1 and NW is incremented from 1 to 28 to insert 28 d signals into store 205. NP is incremented upon the completion of the 28 count of NW until NP=5 at which time the fifth group of 28 d signals is inserted in store 205. After the last d signal insertion for the fifth word position, control pulse EA generated in recognizer 203 is applied to control 221 to terminate the recognition mode and to insert the last word position into word position counter 246 of FIG. 2B via gate 243A.

Assume that the airlines reservation customer utters the series of words, "How much is the fare". The word "how" is first applied to recognizer 203 which provides a correspondence signal d for each prescribed word of Table 1. FIG. 5A shows the arrangement of store 205. Each position of the store is addressed by word position code NP and prescribed word code NW which corresponds to prescribed words $\bar{w}_j$. Seven word columns and 28 prescribed word code rows are included in FIG. 5A so that the maximum length sentence of the FIG. 3 network is accommodated. For the prescribed word $\bar{w}_1$ in word position 1, the d signal (9) representative of the acoustic correspondence between the input word obtained for "how," and the prescribed word, $\bar{w}_1$="is", is entered into position 1,1 of store 205. The prescribed word correspondence signals of word position 1 are sequentially applied to word position column 1 in FIG. 5A. The particular d signals obtained for the first input word "how" referenced to a selected scale, are shown in the k=1 column of FIG. 5A. As shown in column 1 of FIG. 5A, the closest corresponding prescribed word is $\bar{w}_5$="would" which has a correspondence signal d=1. Prescribed words $\bar{w}_2$="fare", $\bar{w}_4$="want", $\bar{w}_6$="like", $\bar{w}_7$="some", $\bar{w}_9$="please" and $\bar{w}_{26}$="how" result in correspondence signals d=2 and prescribed words $\bar{w}_1$="is", $\bar{w}_4$="return", $\bar{w}_{21}$="flight" result in correspondence signals d=9. In similar manner, responsive to the other words of the uttered series, acoustic recognizer 203 (FIG. 2A) generates and transfers the correspondence signals shown in the remaining columns of FIG. 5A to store 205.

If the closest corresponding prescribed word for each word position is identified as the input word, the resulting series from FIG. 5A is, "would some is to fare". All words except "is" and "fare" are incorrectly identified. The recognized word series is unintelligible for purposes of airline reservation information since it is not known which words are in error. In accordance with the invention, the input word series is not identified on the basis of the similarities of individual words to prescribed words, but is identified by selecting the predetermined sequence of prescribed words defined by the state sequence array ending in a final state upon termination of the last series word position which predetermined sequence has the closest cumulative correspondence to the input word series. In this way, the selected sequence is syntactically correct even though the acoustic recognition of individual words is in error.

Figure 7:
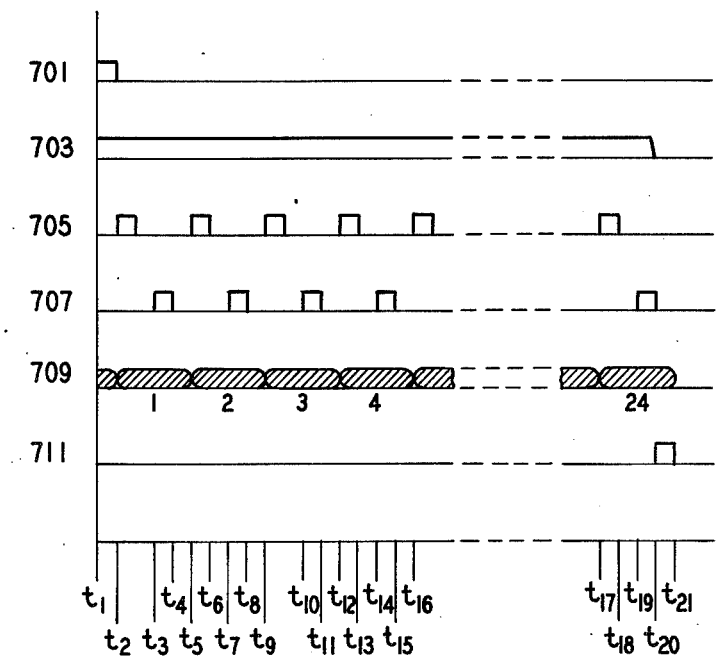

Upon transfer of the correspondence signal d for the last word position of the series (NP=5, $\bar{w}_{28}$), an EA pulse is generated in acoustic recognizer 203 to indicate the termination of recognition mode. Pulse EA is applied to control 221 (FIG. 2A) and control signal A is set to its disabled state. At this time, the last word position, NP=5, is placed in PMAX register 291 (FIG. 2B) via gate 289. Responsive to pulse EA, control signal B is placed in its enabling state and the initialization mode is started. The waveforms of the initialization mode are shown in FIG. 7. At time $t_1$, signal B (waveform 703)

becomes enabling, and a short pulse BP (waveform 701) is generated in control 221. Control pulse BP from control 221 is applied via OR gate 293B to transfer counter 294 of FIG. 2B to reset counter 294 to its zero state at the beginning of the initialization mode.

Each of cumulative correspondence registers 213A and 213B of FIG. 2A includes 24 storage positions corresponding to the states shown on the state sequence network of FIG. 3. When signal B is enabling, register 213B is addressed by signal I from counter 294 (FIG. 2B) via AND gate 247A and OR gate 248 (FIG. 2A). Clock 210 of FIG. 2A, which may comprise oscillator and pulse-forming circuits well known in the art, provides clock pulses CL1 shown in waveform 705 and clock pulses CL2 shown in waveform 707. AND gate 293A (FIG. 2B) is responsive to clock pulse CL1 and signal B from control 221 via OR gate 293C (FIG. 2B) to increment counter 294 to its first state. In this way counter 294 successively counts from 1 to 24 and provides a sequence of 24 I address codes to AND gate 247A (FIG. 2A) whereby the 24 state positions of register 213B are successively addressed while signal B is enabled.

The timing of the I address codes from counter 294 (FIG. 2B) while signal B (waveform 703) is enabled is illustrated in waveform 709. As shown in waveform 709, the I code from counter 294 is 1 between times $t_2$ and $t_5$, 2 between times $t_5$ and $t_9$, 3 between times $t_9$ and $t_{12}$, 4 between times $t_{12}$ and $t_{16}$, and 24 between times $t_{17}$ and $t_{21}$. The I address code representative waveforms which occur between 4 and 24 are omitted in waveform 709.

At time $t_2$, the I=1 code from counter 294 is applied to the address input of register 213B via AND gate 247A and OR gate 248 to address the first state position of register 213B. In the time period between $t_2$ and $t_5$, the $I_1$ code from counter 294 enables gate 236A and the zero code from code generator 288 (FIG. 2B) is supplied via AND gate 236A and OR gate 236E (FIG. 2A) to the input of register 213B. The zero code is inserted into position 1 of register 213B between times $t_3$ and $t_4$ during which the CL2 clock pulse is supplied to the write input of register 213B via gate 241C (FIG. 2A). Responsive to the CL1 clock pulse beginning at $t_5$, counter 294 is incremented and the second position of register 213B is addressed via AND gate 247A and OR gate 248 (FIG. 2A). AND gate 236A of FIG. 2A is disabled for the remainder of the initialization mode because signal $I_1$ from counter 294 is in its disabling state.

Figure 8:
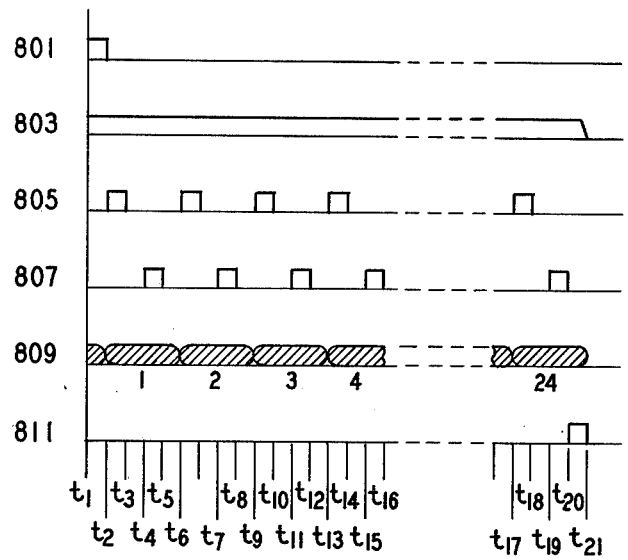

For the remainder of the count of counter 294, gate 236B is enabled by signal B and the output of inverter 236F. The LPN code from code generator 288 is supplied to the input of register 213B via AND gate 236B and OR gate 236E (FIG. 2A). When the second position of register 213B is addressed, the LPN code is inserted into the second position of register 213B responsive to the CL2 clock pulse applied via AND gate 241C between times $t_7$ and $t_8$. In similar manner, the succeeding positions of register 213B are successively addressed by the I output of counter 294 and the LPN code is inserted in each of these positions. At time $t_{20}$ in the 24th I address state of counter 294, ending pulse EI (waveform 711) is generated in counter 294 by means of a comparison arrangement well known in the art. The EI pulse is applied to control 221 via AND gate 222A (FIG. 2A). Control 221 is responsive to the output of AND gate 222A at this time to disable control signal B and to enable control pulse CP and control signal C shown in waveforms 801 and 803 of FIG. 8.

Responsive to control pulse CP of waveform 801, counter 294 (FIG. 2B) is reset to its zero state. The I output of counter 294 is applied to the address input of register 213B via AND gate 247B and OR gate 248. Additionally, the I output of counter 294 is supplied to the address input of register 213A via AND gate 239A and OR gate 240. The successive I states 1, 2, 3, 4 and 24 occurring when signal C is enabling, are shown in waveform 809. The I address outputs which occur between 4 and 24 are omitted in FIG. 8.

When counter 294 is in its first state between times $t_2$ and $t_6$ (FIG. 8), the LPN code from code generator 288 is supplied to the input of register 213B via AND gate 236C and OR gate 236E. Responsive to the CL1 clock pulse (waveform 805) occurring between times $t_2$ and $t_3$, the zero code in the first position of register 213B is read out therefrom and applied to the input of register 213A via lines 251 and 252 of FIG. 2A. Between times $t_4$ and $t_5$, the CL2 clock pulse (waveform 807) is supplied to the write input register 213A via gate 237 (FIG. 2A) and to the write input of register 213B via gate 241C (FIG. 2A). In this time period, the zero code from the first position of register 213B is inserted into the first position of register 213A and the LPN code at the input of register 213B is inserted into the first position of register 213B.

In the subsequent time periods defined by the I output of counter 294, the LPN codes in register 213B are successively transferred to the corresponding positions of register 213A and the LPN codes from generator 288 are inserted into the successive positions of register 213B. At time $t_{20}$ in the twenty-fourth state of counter 294, an ending pulse EI (waveform 811) is generated in counter 294. The EI pulse applied to control 221 via gate 222C causes control 221 to disable signal C at time $t_{21}$ in FIG. 8 and to enable control pulse DP and control signal D shown in waveforms 901 and 903 of FIG. 9. At the end of the initialization mode, cumulative correspondence register 213A contains a zero in the first state position and LPN codes in the remaining 23 state positions. At this time, register 213A contains the initial cumulative correspondence signals in accordance with equation (4) an cumulative correspondence register 213B contains an LPN code in each state position.

In the state sequence mode initiated by control pulse DP, the previously obtained, or initial, cumulative correspondence signals in register 213A are added to the correspondence signals or word correspondence store 205 in adder 257 (FIG. 2A) in accordance with the state transition signals stored in state sequence array 207. The resulting cumulative correspondence signal for each state sequence signal is transferred to register 213B via delay 261 (FIG. 2A) as addressed by the $q_s$ coded signal from array 207. After all state transition signals are sequenced, the contents of register 213B are transferred to register 213A. This signal generation and transfer is repeated for each word position.

Figure 9:
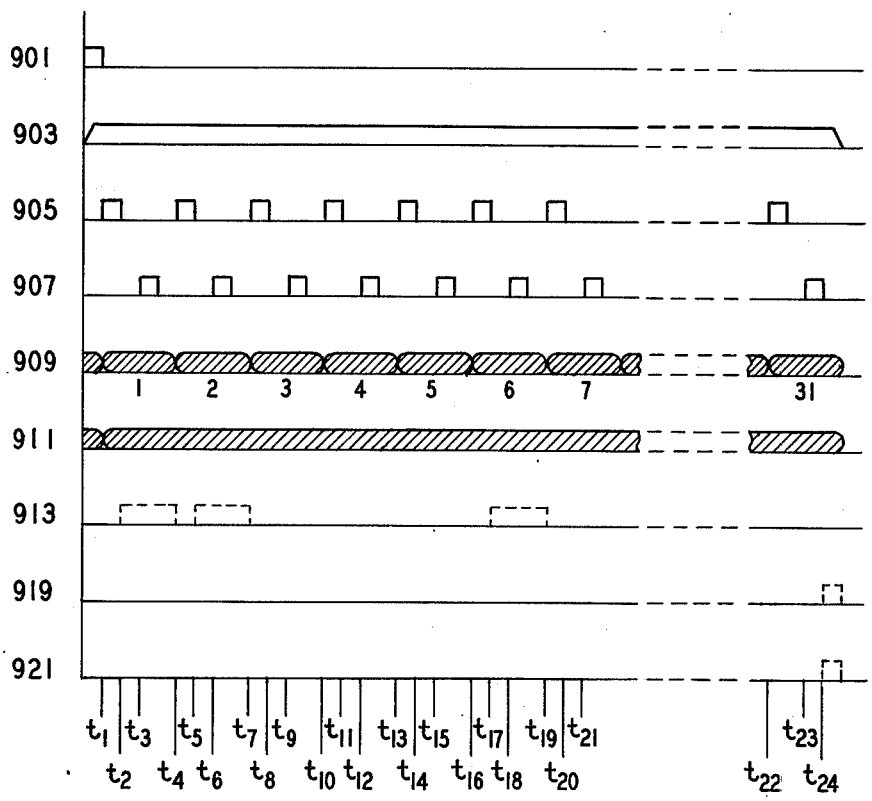

FIG. 9 shows the waveforms which illustrate the opertion of the circuit of FIG. 2 in the D signal cycle of the state sequence mode. Waveform 901 shows the DP control pulse, waveform 903 shows control signal D; and waveforms 905 and 907 show clock signals CL1 and CL2, respectively. Responsive to the DP control pulse, state sequence counter 244 (FIG. 2B) is reset to its zero state at the beginning of the D cycle. Word position counter 246 was previously reset to its first state by the BP pulse in the initialization mode.

The arrangement of state sequence array 207 (FIG. 2B) is shown in FIG. 4. Referring to FIG. 4, each signal of the array contains four codes. The L code represents the sequential address of the signal; the $q_p$ code represents the initial state of the state transition; the $\overline{w}_j$ code represents the prescribed word code of the state transition; and the $q_s$ code represents the terminal state of the state transition. For each word position, state sequence counter 244 is successively incremented responsive to the CL1 clock pulse applied via gate 243 (FIG. 2B) so that the signals in array 207 are read out in sequence from L=1 to L=31. As shown in FIG. 4, array 207 contains 31 state transition signals which signals represent all the state transitions of the sequence network of FIG. 3.

The address outputs of counter 244 are represented in waveform 909. In waveform 909, the first 7 successive addresses and the 31st address are shown. The intermediate address waveforms which occur are omitted. Waveform 911 illustrates the output address k from position counter 246 (FIG. 2B). At time $t_1$ in FIG. 9, state sequence counter 244 is incremented to its first state and the output code therefrom is applied via line 249 to the address input of array 207. The initial state code $q_p$ read out from array 207 at time $t_1$ is 1, corresponding to state 1 of the network of FIG. 3. State 1 is the starting state since each sequence in FIG. 3 begins in this state. The $\overline{w}_j$ code is $\overline{w}_3$, corresponding to word "I" in Table 1; and the terminal state code $q_s$ read out is b 2, corresponding to state 2 in FIG. 3. The $q_p$ code is applied to gate 239B (FIG. 2A) to address register 213A via AND gate 239B and OR gate 240. The $q_p$ code is also applied to the input of selected state sequence store 217A of FIG. 2B. The $\overline{w}_j$ code from array 207 is applied to the word address input of word correspondence store 205 (FIG. 2A) via gates 229 and 231 and is also applied to the input of selected word sequence store 217B of FIG. 2B.

Responsive to $q_p=1$, the zero code in position 1 of register 213A is applied to one input of adder 257 via line 215. The other input to adder 257 is obtained via line 205A from the output of store 205 as addressed by the $\overline{w}_3$ code from array 207 and the k=1 code from word position counter 246. At this time, the word position counter is in its first state so that the correspondence signal d=7 is read from the $\overline{w}_3$ position of the first column of store 205 shown in FIG. 5A.

The resulting sum from adder 257 is applied to one input of comparator 263 (FIG. 2A) via line 235. The other input to comparator 263 is obtained from the second position of register 213B as addressed by the $q_s=2$ code from array 207 of FIG. 2B. Since the resulting sum (7) from adder 257 is less than the LPN code from register 213B, the output of comparator 263 becomes enabling and the $C_1$ output of flip-flop 264 is set as indicated on dotted waveform 913 at time $t_2$. Signal $C_1$ from flip-flop 264 of FIG. 2A is applied to the write input of register 213B via AND gate 241A, OR gate 241B and AND gate 241C when clock pulse CL2, occurring at time $t_3$, is enabling. The delayed output from adder 257 is supplied from delay 261 (FIG. 2A) as signal $T_1$ to gate 236D (FIG. 2A) and is transferred therefrom via gates 236D and 236E to the input of cumulative correspondence register 213B. The resulting sum (7), the cumulative correspondence signal, is inserted into position 2 of register 213B at $t_3$ as addressed by the $q_s=2$ code from array 207.

Signal $C_1$ from flip-flop 264 is also applied to the write inputs of stores 217A and 217B of FIG. 2B at time $t_3$ when clock pulse CL2 is activated. Store 217A is addressed by the $q_s=2$ code applied to gate 273A (FIG. 2B). The $q_s=2$ code is applied to the address input of store 217A via gates 273A and 273F. At this time, the k+1 code from word position counter 246 is applied to gate 273C (FIG. 2B) so that the address (k+1=2) is supplied to the address input of store 217A via gates 273C and 273E.

The arrangement of store 217A is shown in FIG. 5B and the arrangement of store 217B is shown in FIG. 5C. Responsive to the address $q_s=2$ and k+1=2, the $q_p=1$ code applied to the input of store 217A is inserted into the $q_s=2$, k+1=2 position of store 217A for use in the retrieval of the selected predetermined sequence prescribed words in the sequence formation mode. The $\overline{w}_3$ code from array 207 is inserted into store 217B as addressed by the $q_s=2$ code from array 207 and the k+1=2 code from word position counter 246. The $q_s$ code is supplied to the address input of store 217B via gates 273A and 273F when the D signal is enabling and the k+1 code is similarly supplied to the address input of store 217B via gates 273C and 273E.

At time $t_4$, flip-flop 264 is reset by clock pulse CL1 and counter 244 is incremented to its second state. The L=2 entry of array 207 ($q_p=2$, $\overline{w}_j=\overline{w}_4$, $q_s=3$) now appears at its output. Responsive to $q_p=2$ from array 207, the LPN code in the second state position of register 213A is read out and applied to one input of adder 257. The d=2 correspondence signal from the k=1, $\overline{w}_4$ position of store 205 is applied to the other input of adder 257. The resulting sum is compared to the LPN code from the second ($q_s=2$) position of register 213B in comparator 263. Since the resulting sum from adder 257 is greater than or equal to the LPN code from register 213B, flip-flop 264 remains reset. The second position of register 213B is unaltered and no signal is inserted into either selected state sequence store 217A or selected word sequence store 217B. This occurs because the state transition signal ($2,\overline{w}_4,3$) is not part of a sequence in the network of FIG. 3 in this first word position.

The CL1 clock pulse occurring at $t_7$ increments counter 244 to its L=3 state and the third entry of array 207 ($q_p=3$, $\overline{w}_j=\overline{w}_7$, $q_s=4$) appears at the output thereof. The LPN code is read from state position 3 of register 213A responsive to the $q_p=3$ code and comparator 263 does not cause flip-flop 264 to be set. Consequently, the $q_s=4$ state position of register 213B remains unchanged and no signals are inserted into stores 217A or 217B. During the next 14 states of counter 244 (L=4 through L=17) the output from register 213A is the LPN code so that flip-flop 264 is not set and registers 213B and stores 217A and 217B are not changed. The LPN codes in these positions of register 213A indicate that any state transition signal addressing these positions is not part of a predetermined sequence in word position 1.

When counter 244 is set to its L=18 state, the output of array 207 becomes $q_p=1$, $\overline{w}_j=\overline{w}_{26}$, $q_s=8$. The $q_p=1$ code (starting state) applied to the address input of register 213A via gates 239B and 240 causes the zero code to be read from the first position of register 213A. At this time the d=2 correspondence code is read from the k=1, $\overline{w}_{26}$ position of store 205. The zero code and the d=2 code are added in adder 257 but the resulting sum is less than the LPN code in the $q_s=8$ position of register 213B. Consequently, flip-flop 264 is set by the output of comparator 263. Signal $C_1$ from flip-flop 264 is then supplied to AND gate 241A so that gate 241C is enabled via OR gate 241B.

At the next CL2 pulse, gate 241C is turned on whereby the write input of register 213B is enabled. The delayed resulting sum of 2 is then inserted as signal $T_1$ into the $q_s=8$ position of register 213B as addressed from gate 247C. At the same time, signals CL2, D and C1 enable gate 272 (FIG. 2B) and the $q_p=1$ code from array 207 is inserted into the $k+1=2$, $q_s=8$ position of store 217A as shown in FIG. 5B. Similarly, the $\overline{w}_{26}$ code from array 207 is inserted into the $k+1=2$, $q_s=8$ position of store 217B as shown in FIG. 5C. No other signals are inserted into register 213B, store 217A or store 217B during the remaining portion of the $k=1$ word position interval since the $q_p$ codes in the L=19 through L=31 positions of state sequence array 207 address state positions $q_p$ in register 213A which contain LPN codes.

At time $t_{24}$ (FIG. 9), when counter 244 is in its thirty-first state, pulse EL (waveform 919) is generated in counter 244. This EL pulse is applied to word position counter 246 to switch the counter to its next (k=2) state. The EL pulse is also supplied to control 221 via AND gate 222B and OR gate 222C. Control 221 is responsive to the EL pulse from OR gate 222B, the $\overline{EK}$ signal from counter 246 and the D signal to disable signal D (waveform 903) and to enable pulse CP and signal C as shown in waveforms 801 and 803 of FIG. 8. The CP pulse causes transfer counter 294 to be reset to its zero state.

As aforementioned with respect to the initialization mode, the circuit of FIG. 2 is operative to transfer the cumulative correspondence signals of the first word position in correspondence register 213B to correspondence register 213A when signal C is enabling and is also operative to insert the LPN code from generator 288 into each position of register 213B. Both registers 213A and 213B are addressed by the I output of transfer counter 294, which counter is sequenced responsive to the CL1 clock pulses applied to gate 293. At $t_{20}$ in the twenty-fourth state of counter 294, signal EI is obtained from the counter as shown in waveform 811 of FIG. 8. The EI pulse is applied to control 221 via gate 222C and control 221 causes the C signal to be disabled and enables the DP pulse (waveform 901) and control signal D (waveform 903) so that the state sequence mode is reinitiated for the second word position interval.

At the beginning of the state sequence mode for the second word position interval, position 2 of register 213A contains the cumulative correspondence signal 7 and position 8 of register 213A contains the cumulative correspondence signal 2. All other state positions of register 213A contain LPN codes. Thus, as indicated in the network in FIG. 3, there are only 2 sequences of FIG. 3 in the first word position. Consequently, the only positions of state sequence array 207 which causes the $C_1$ signal from flip-flop 264 to be placed in its enabled state are L positions, 2, 6, 8, 19 and 27. When state sequence counter 244 is incremented to its L=2 position, the outputs of state sequence array 207 are initial state code $q_p=2$, prescribed word code $\overline{w}_j=\overline{w}_4$, and terminal state code $q_s=3$. Adder 257 is operative to sum the cumulative correpondence signal (7) from the second position of register 213A and the d signal (9) obtained from the k=2, $\overline{w}_4$ position of word correspondence store 205. The resulting sum (16) is less than the LPN code in position 3 of register 213B so that flip-flop 264 is set by comparator 263 and signal $c_1$ is enabled until the next CL1 pulse. The $C_1$ output for the L=2 position is shown in dotted waveform 913 between times $t_5$ and $t_7$. Responsive to signal CL2 at time $t_6$, the cumulative correspondence signal 16 is inserted into the third ($q_s=3$) position of register 213B. The $q_p=2$ code is inserted into the $k+1=3$, $q_s=3$ position of selected state sequence store 217A and the $\overline{w}_4$ code is inserted into the $k+1=3$, $\overline{w}_4$ position of selected word sequence store 217B.

Responsive to the $q_p=2$, $\overline{w}_j=\overline{w}_5$, $q_s=7$ output of state sequence array 207 in the L=6 position of array 207 as addressed by the L=6 position output of counter 244, the cumulative correspondence signal (7) is supplied from the second position of register 213A to adder 257 and the d correspondence signal (5) is supplied from the $k=2$, $\overline{w}_5$ position of store 205 to adder 257. Since the resulting sum (12) is less than the LPN code in position 7 of store 213B, signal $C_1$ is enabled at time $t_{17}$. The cumulative correspondence signal (12) from delay 261 is then inserted into the $q_s=3$ position of register 213B at time $t_{18}$. The $q_p=2$ code is inserted into the $k+1=3$, $q_s=7$ position of store 217A and the $\overline{w}_5$ code is inserted into the $k+1=3$, $q_s=7$ position of store 217B.

Similarly, the $q_p=2$, $\overline{w}_j=\overline{w}_{22}$, $q_s=22$ signal in the eighth position of array 207 is obtained from array 207 when counter 244 reaches its L=8 state. Signal $C_1$ is enabled since the sum of the d signal and the cumulative correspondence signal in position 2 of register 213A (14) is less then the LPN code in position $q_s=22$ of register 213B. Signal $C_1$ at this time causes the sum to be inserted into the twenty-second position of register 213B and also causes the $q_p=2$ and $\overline{w}_{22}$ codes to be inserted into the $k+1=3$, $q_s=22$ positions of stores 217A and 217B, respectively.

When state sequence counter 244 addresses the L=19 position of array 207, the $q_p=8$, $\overline{w}_j=\overline{w}_{27}$, $q_s=9$ codes are available at the output of the array and the sum of the $q_s=8$ position of register 213B and the d signal in the $k=2$, $\overline{w}_{27}$ position of store 205 is formed in adder 257. The resulting sum (4) is less than the LPN code in the ninth position of register 213B and signal $C_1$ is enabled. The sum (4) is inserted into the $q_s=9$ position of register 213B. The $q_p=8$ and $\overline{w}_{27}$ codes are inserted into the $k+1=3$, $q_s=9$ positions of stores 217A and 217B, respectively.

At the time counter 244 addresses the twenty-seventh position of state sequence array 207, the $q_p=2$, $\overline{w}_j=\overline{w}_{28}$, $q_s=3$ codes are obtained therefrom. The 7 code from the second position of register 213A is added to the d signal (6) obtained from the $k=2$, $\overline{w}_{28}$ position of correspondence store 205. The sum (13) is compared to the cumulative correspondence signal (16) in position 3 of store 213B. This 16 signal was previously entered into the third position of register 213B responsive to the second entry of state sequence array 207. Since the sum from adder 257 (13) is less than the contents of the third position of register 213B, flip-flop 264 is set and signal $C_1$ is enabled. The resulting sum is then entered into the third position of register 213B to replace the previous entry; the $q_p=2$ code is reinserted into store 217A in the $k+1=3$, $q_s=3$ position. At this time, the $\overline{w}_{28}$ code replaced the $\overline{w}_4$ code in the $k+1=3$, $q_s=3$ position of store 217B as shown in FIG. 7. This last entry corresponds to the occurrence of two alternative prescribed words between a given pair of initial and terminal states. In this event, the minimum cumulative correspondence signal is retained in register 213B and the prescribed word code associated with the mininum cumulative correspondence signal is retained in selected word sequence store 217B. Only the prescribed word codes in store 217B at the end of each word position interval are shown in FIG. 5C.

At the end of the L=31 state of counter 244, pulse EL is obtained therefrom. The EL pulse increments word position counter 246 to its k=3 state and causes control 221 to disable signal D and to enable pulse CP and control signal C so that the contents of register 213B are transferred to register 213A and the LPN code is inserted into each position of register 213B. These transfers are addressed by the I signals from transfer counter 294 which is successively incremented responsive to the CL1 pulse applied to gate 293A when signal C is enabling. At the end of the transfer, when counter 294 is in its twenty-fourth state, ending pulse EI is obtained.

At the beginning of the state sequence mode for the third word position, when word position counter is in its R=3 state, positions $q_p$ 3, 7, 9 and 22 of register 213A contain the cumulative correspondence signals 13, 12, 4 and 14, respectively. All other positions of register 213A and each position of register 213B contain an LPN code. As previously described with respect to the state sequence mode of the second word position, the entires in state sequence array ROM 207 are sequentially addressed under control of counter 244.

The d correspondence signals from word corrspondence store 205 are read out in accordance with the k=3 signal from word position counter 246 and the $\overline{w}_j$ codes from array 207. The cumulative correspondence signals in the positions of register 213A are read out as addressed by the $q_p$ signals from array 207 and the resulting cumulative correspondence signals from delay 261 are applied to register 213B as addressed by the $q_s$ codes from array 207 when signal $C_1$ from flip-flop 264 is enabled. The k+1=4 signal from word position counter 246 and the $q_s$ codes from array 207 address the insertion of the $q_p$ codes and the $\overline{w}_j$ codes from array 207 into selected state sequence store 217A and selected word sequence store 217B.

At the end of the period when counter 244 is in its L=31 state, the formation of the cumulative correspondence signals for the third word position interval is completed and these cumulative correspondence signals are in register 213B. Table 2 lists the state transition signal codes from an array 207 that result in non-LPN cumulative correspondence signals, $\phi_s$, in register 213B, the previous word position cumulative correspondence signals $\phi_p$ in register 213A for each sequence state transition signal, the resulting non-LPN $\phi_s$ signals in register 213B for each entry, and the addressed d correspondence signals in word position k=3 in store 205.

TABLE 2

| L | $q_p$ | $\overline{w}_j$ | $q_s$ | $\phi_p$ | d | $\phi_s$ |
|---|---|---|---|---|---|---|
| 3 | 3 | $\overline{w}_7$ | 4 | 13 | 9 | 22 |
| 7 | 7 | $\overline{w}_6$ | 3 | 12 | 2 | 14 |
| 9 | 22 | $\overline{w}_{23}$ | 23 | 14 | 4 | 18 |
| 12 | 3 | $\overline{w}_{12}$ | 15 | 13 | 6 | 19 |
| 20 | 9 | $\overline{w}_1$ | 10 | 4 | 1 | 5 |
| 23 | 3 | $\overline{w}_{10}$ | 12 | 13 | 8 | 21 |

The $q_p$ states listed in Table 2 are stored in the k+1=4 word position of store 217A as shown in FIG. 5B and the $\overline{w}_j$ prescribed word codes listed in Table 2 are stored in the k+1=4 position of store 217B as shown in FIG. 5C. For example, the L=20 signal codes of array 207, $q_p$=9, $\overline{w}_j$=$\overline{w}_1$, $q_s$=10, causes the contents of the ninth position of the register 213A ($\phi_p$=4) to be added to the d=1 signal from the k=3, $\overline{w}_1$ position of store 205. The resulting sum ($\phi_s$=5) is inserted into the tenth position of register 213B and the $q_p$=9 code is entered into k+1=4, $q_s$=10 position of store 217A. Similarly, the $\overline{w}_1$ code from array 207 is inserted into the k+1=4, $q_s$=10 position of store 217B.

Responsive to the EL pulse at the end of the thirty-first count of counter 244, word position counter 246 is incremented to its k=4 state and control 221 disables signal D and enables signal C. When signal C is present, the contents of register 213B are transferred to register 213A and the LPN code is inserted into each position of register 213B. The state sequence mode for the fourth position is initiated after the twenty-fourth count of transfer counter 294 by the EI pulse therefrom. The EI pulse is applied to control 221 which, in turn, enables the DP pulse and the D signal and disables signal C.

During the state sequence mode for the fourth word position, the cumulative correspondence signals in register 213A are incremented by the contents of the k=4, $w_j$ positions of word correspondence store 205 in accordance with the sequence of coded signals from state sequence array 207. Table 3 lists the state transition signals codes that result in cumulative correspondence signals $\phi_s$ in register 213B other than LPN, the previous word position cumulative correspondence signals $\phi_p$ in register 213A, the d signals addressed in word position k=4 of store 205, and the resulting non-LPN cumulative correspondence signals $\phi_s$ in register 213B.

TABLE 3

| L | $q_p$ | $\overline{w}_j$ | $q_s$ | $\phi_p$ | d | $\phi_s$ |
|---|---|---|---|---|---|---|
| 3 | 3 | $\overline{w}_7$ | 4 | 14 | 8 | 22 |
| 4 | 4 | $\overline{w}_8$ | 5 | 22 | 7 | 29 |
| 10 | 23 | $\overline{w}_{24}$ | 24 | 18 | 6 | 24 |
| 12 | 3 | $\overline{w}_{12}$ | 15 | 14 | 9 | 23 |
| 13 | 15 | $\overline{w}_{17}$ | 16 | 19 | 7 | 26 |
| 16 | 15 | $\overline{w}_{20}$ | 18 | 19 | 5 | 24 |
| 21 | 10 | $\overline{w}_{15}$ | 11 | 5 | 2 | 7 |
| 23 | 3 | $\overline{w}_{10}$ | 12 | 14 | 1 | 15 |
| 24 | 12 | $\overline{w}_{11}$ | 13 | 21 | 8 | 29 |
| 28 | 12 | $\overline{w}_{14}$ | 19 | 21 | 4 | 25 |

The $q_p$ states listed in Table 3 are inserted in store 217A as addressed by the associated $q_s$ code in the k+1=5 row as shown in FIG. 5B and the $\overline{w}_j$ prescribed word codes listed in Table 3 are similarly placed in the $q_s$, k+1=5 positions of store 217B. For example, the L=3 entry of array 207 ($q_p$=3, $\overline{w}_j$=$\overline{w}_7$, $q_s$=4) causes the contents of the $q_p$=3 position of register 213A to be added to the d=8 correspondence signal from the k=4, $\overline{w}_7$ position of correspondence store 205. The resulting sum (22) is inserted in the $q_s$=4 position of register 213B. The $q_p$=3 code is put into the k+1=5, $q_s$=4 position of store 217A and $\overline{w}_7$ is placed in the k+1=5, $q_s$=4 position of store 217B.

The EL pulse generated in counter 244 at the end of its 31st count increments counter 246 to its k=5 state and causes control 221 to disable the D signal and to enable the CP and C signals. The CP signal initiates a transfer cycle during which the contents of register 213B are transferred to register 213A and an LPN code is inserted into each position of register 213B. At the end of the 24th count of transfer counter 294, an EI pulse is generated and applied from an output of counter 294 to control 221 via gate 222C. Control 221 disables signal C and enables pulse DP and signal D to initiate the state sequence mode for the fifth word position.

In the fifth word position state sequence mode, the cumulative correspondence signals obtained during the fourth word position and stored in register 213A are augmented by the contents of the k=5 column of store 205 as addressed by the coded signals in state sequence array ROM 207. Table 4 lists the resulting non-LPN cumulative correspondence signals, $\phi_s$, in register 213B in the state sequence mode, together with the associated codes of array 207, the associated initial cumulative correspondence signals $\phi_p$ in register 213B, and the addressed d signals from store 205.

TABLE 4

| L  | $q_p$ | $\overline{w}_j$ | $q_s$ | $\phi_p$ | d | $\phi_s$ |
|----|-------|------------------|-------|----------|---|----------|
| 4  | 4     | $\overline{w}_8$ | 5     | 22       | 8 | 30       |
| 5  | 5     | $\overline{w}_9$ | 6     | 29       | 9 | 38       |
| 11 | 24    | $\overline{w}_{25}$ | 6  | 24       | 6 | 30       |
| 13 | 15    | $\overline{w}_{17}$ | 16 | 23       | 5 | 28       |
| 14 | 16    | $\overline{w}_{18}$ | 17 | 26       | 9 | 35       |
| 16 | 15    | $\overline{w}_{20}$ | 18 | 23       | 8 | 31       |
| 17 | 18    | $\overline{w}_{17}$ | 6  | 24       | 5 | 29       |
| 22 | 11    | $\overline{w}_2$ | 6     | 7        | 1 | 8        |
| 24 | 12    | $\overline{w}_{11}$ | 13 | 15       | 5 | 20       |
| 25 | 13    | $\overline{w}_{12}$ | 14 | 29       | 8 | 37       |
| 28 | 12    | $\overline{w}_{14}$ | 19 | 15       | 8 | 23       |
| 29 | 19    | $\overline{w}_{24}$ | 20 | 25       | 9 | 34       |

As indicated in Table 4, the fifth, eleventh, seventeenth, and twenty-second position codes in array 207 terminate in state position $q_s=6$. As previously described with respect to the second word position state sequence mode, only the minimum cumulative correspondence signal for a given terminating state position is retained in register 213B and only the $q_p$ and $\overline{w}_j$ codes corresponding to the minimum cumulative correspondence signal are retained in stores 217A and 217B. Thus, with respect to terminating state position $q_s=6$, the minimum cumulative correspondence signal (8) is stored in the sixth position of register 213B at the end of the fifth word position sequence mode. The corresponding $\overline{w}_2$ prescribed word code is stored in the k+1=6, $q_s=6$ position of store 217B and the initial state $q_p=11$ code is stored in the k+1=6, $q_s=6$ position of store 217A.

Upon completion of the L=31 operation of array 207, an EL pulse is generated in state sequence counter 244. At this time, an EK signal is generated in word position counter 246 since word position 5 is the last word position. The EK and EL signals are applied to control 221 via gate 222D. Responsive to the output of gate 222D, control 221 is operative to enable the EP pulse (waveform 1001) and E control signal (waveform 1003) and to disable the D signal.

Pulse EP initiates the sequence selection mode in which the cumulative correspondence signals of the final states which end the predetermined sequences of the state sequence network of FIG. 3 are compared; and the final state $q_{fmin}$ associated with the minimum cumulative correspondence signal, $\phi_{fmin}$ is selected and stored in register 281. In the network of FIG. 3, there are two final states, $q_f=5$ and $q_f=6$. Among the predetermined sequences ending at state 5 is the five-word sequence "I would like some information" and among the predetermined sequences ending at state 6 is the five-word sequence, "How much is the fare".

In accordance with the invention, the cumulative correspondence signals for the five-word sequences ending at states 5 and 6, are compared to determine the sequence having the closest cumulative correspondence to the input spoken word series. The cumulative correspondence signals for predetermined sequences which are not in their final states at the end of the fifth word position are not considered since these sequences are syntactically incomplete. For example, the cumulative correspondence signal (31) in the $q_s=18$ state position of register 213B at the end of the fifth word position corresponds to the incomplete sequence, "I would like a non-stop", which sequence is not syntactically meaningful.

Final state store 277 (FIG. 2B) includes two positions, the first position contains the final state $q_f=5$ and the second position contains the final state $q_f=6$. Final state counter 276 (FIG. 2B) which addresses store 277 is therefore a three-state counter, including the states 0, 1 and 2. Responsive to the EP pulse shown in waveform 1001 of FIG. 10, final state counter 276 is reset to its zero state at time $t_1$. Signal EP is applied to AND gate 266C (FIG. 2A) together with the LPN code from code generator 288. The LPN code is inserted into register 268 via ANd gate 266C and OR gate 266E (FIG. 2A) upon the occurrence of the EP pulse which also supplies a write enabling input via OR gate 266A. At time $t_2$ the CL1 clock pulse (waveform 1005) is turned on and final state counter 276 is incremented to its first state via gate 275. The first-state address is shown between times $t_2$ and $t_5$ on waveform 1009 of FIG. 10.

Responsive to the output of counter 276 at time $t_2$, the $q_f=5$ code is obtained from the output of final state store 277 as the $q_f$ signal. This $q_f=5$ signal addresses the fifth position of register 213B via AND gate 247D and OR gate 248 (FIG. 2A) so that the last word position cumulative correspondence signal in the fifth position (30) is applied to comparator 269 via lines 251 and 269A. The LPN code in register 268 at this time is also applied to comparator 269 (FIG. 2A). Since the content of the fifth position of register 213B is smaller than the LPN code in register 268, flip-flop 271 (FIG. 2A) is set by comparator 269 and a $C_2$ signal is obtained therefrom at time $t_3$ as shown in waveform 1013.

Signal $C_2$ enables AND gate 266D whereby the content of position 5 of register 213B is inserted into register 268 via delay 268A. Register 268 is write-enabled by the $C_2$ signal applied to gate 266B at time $t_4$ when the CL2 clock pulse (waveform 1007) is active. The $q_f=5$ output from store 277 is inserted into register 281 (FIG. 2B) at this time via AND gate 278B and OR gate 278C since register 281 is write-enabled by the $C_2$ pulse applied to AND gate 279A. Thus, just prior to $t_5$ in FIG. 11, each of registers 268 and 281 contains the last word position cumulative correspondence signal (30) of the fifth position of register 213B.

Figure 10:
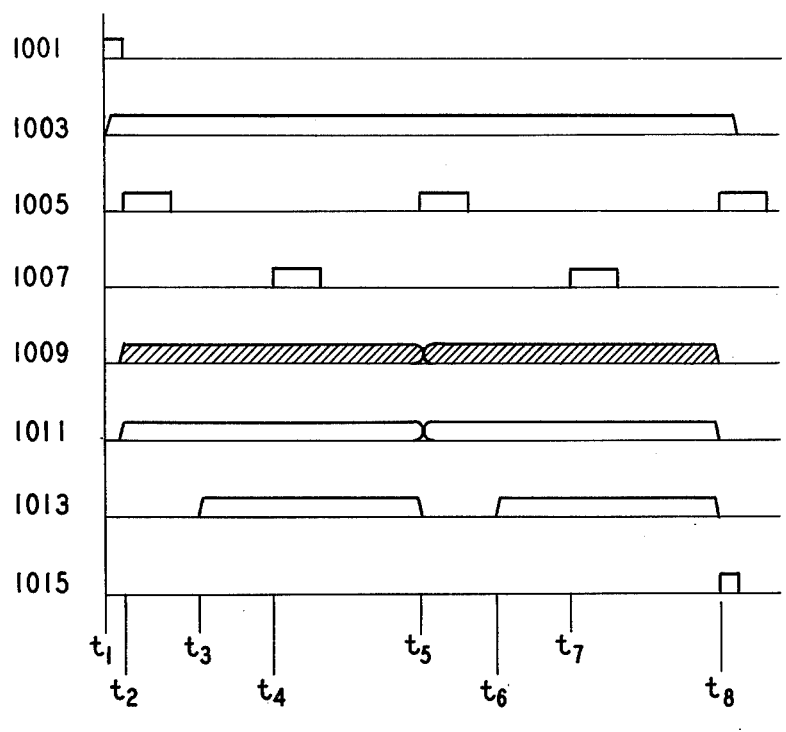

The CL1 clock pulse beginning at time $t_5$ is supplied via gate 275 to increment final state counter 276 to its second state as indicated in waveform 1009 of FIG. 10. Responsive to the second state output of counter 276, the $q_f=6$ code in the second position of final state store 277 is read out and applied to gate 247D (FIg. 2A) , which gate is enabled to address the sixth position of register 213B. The last word position cumulative correspondence signal (8) in position 6 of register 213B is supplied to one input of comparator 269 via lines 251 and 269A. Comparator 269 (FIG. 2A) compares the contents of register 268 (30) to the signal from register 213B and, since the last word position cumulative correspondence signal from register 213B is less than the contents of register 268, flip-flop 271 is set. The $C_2$ signal is obtained from flip-flop 271 as shown at time $t_6$ in waveform 1013.

With signal $C_2$ enabled, the last word position cumulative correspondence signal from the sixth position of register 213B is inserted into register 268 which is write-enabled by the $C_2$ and CL2 pulses applied to gate 266B at time $t_7$. The output of the final state store 277 is also inserted into register 281 which is write-enabled by the $C_2$, E, and CL2 pulses applied at a time $t_7$ to gate 279A. At time $t_8$, the ending pulse EE is generated in final state counter 276 and is applied to control 221 which is operative to terminate the sequence selection mode by disabling signal E. Control pulse FP and control signal F are generated in control 221 at this time to start the selected sequence formation mode in which the prescribed words of the selected sequence are read out in reverse order from selected word sequence store 217B and inserted therefrom into selected sentence register 219.

Figure 11:
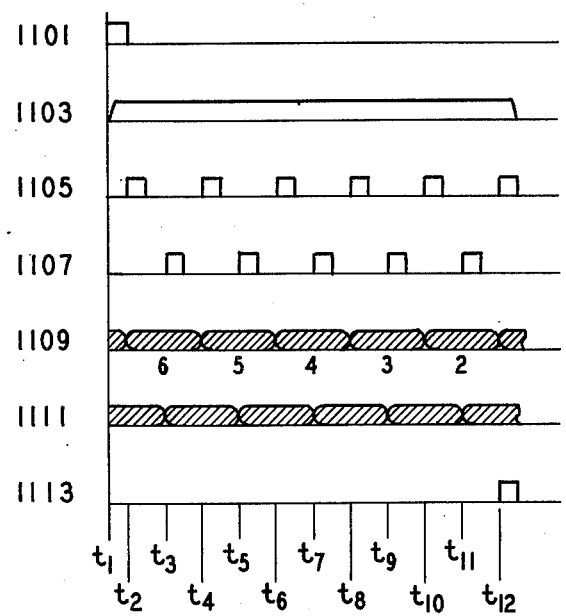

Control pulse FP, shown in waveform 1101, enables AND gate 285 (FIG. 2B9 at time $t_1$ in FIG. 11 so that counter 287 (FIG. 2B) is initially set to the $p_{max}+2$ code responsive to the $p_{max}$ code stored in $p_{max}$ register 291 (FIG. 2B). In the example shown, $p_{max}+2$ is 7. At time $t_2$, composition counter 287 is decremented to its sixth state by the CL1 pulse applied via AND gate 283 when signal F is enabling. At this time, the $q_2=6$ code at the output of register 281 is applied to gate 272B (FIG. 2B) whereby the $q_s=6$ positions of stores 217A and 217B are addressed and the N=6 output is obtained from counter 287 as represented in waveform 1109. The M=6 signal is supplied to the address inputs of stores 217A and 217B via AND gate 273D and OR gate 273E when signal F is enabling.

Responsive to the $Q_2=6$, M=6 address, the $w_2$ prescribed word code is read out of store 217B as the $w_5$ sequence code and applied therefrom to the input of selected sentence register 219. Concurrently, the $q_p=11$ code is read out of store 273A and is applied therefrom to gate 278A. Upon the occurrence of the next CL2 pulse at time $t_3$, the $w_5=w_2$ code is inserted into the sixth position of register 219 which is addressed by the M=6 code and write-enabled via gate 295. Since register 281 is write-enabled by the F signal and the CL2 pulse applied to AND gate 279B at this time, the $q_p=11$ code is inserted into register 281.

At time $t_4$ in FIG. 11, counter 287 is decremented to its fifth state, responsive to the F signal and the CL1 pulse applied via AND gate 283 and the k+1=5, $q_s=11$ positions of stores 217A and 217B are addressed via gates 273B and 273D. The $w_{15}$ code is now read out of store 217B as the $w_4$ sequence code and inserted into the fifth position of register 219 at time $t_5$. The $q_p=10$ code is inserted into register 281 via ANd gate 278A and OR gate 278C since register 281 is write-enabled by the CL2 clock pulse applied to gate 279B.

Counter 287 is decremented to its fourth state at time $t_6$, and the $w_1$ code from the k+1=4, $q_s=10$ position of store 217B is transferred into the fourth position of register 219 as the $w_3$ sequence code. Similarly, the $q_p=9$ code is retrieved from the k=4, $q_s=10$ position of store 217A and is inserted into register 281. Responsive to the CL1 pulse occurring at time $t_8$, counter is decremented to the third state so that the $w_{27}$ code is transferred from the k+1=3, $q_s=9$ position of store 217B to the third position of register 219 as the $w_2$ code, and the $q_p=8$ code from the k+1=3, $q_s=9$ position of store 217A is inserted into register 281.

Counter 287 is again decremented to its second state at time $t_{10}$ whereby the $w_{26}$ code in the k+1=2, $q_s=8$ position of store 217B is inserted into the second position of store 219 as the $w_1$ code. When the end of the second state of counter 287 is reached, an ending pulse, EM, is generated therein and is transferred to control 221 to terminate the sequence formation code. Ending pulse EM also transfers the prescribed word sequence in register 219 W=$w_5$, $w_4$, $w_3$, $w_2$, $w_1$ to code generator 220. Responsive to the prescribed word code sequence from register 219, a control signal is generated in generator 220, which control signal is applied to data processor 121 of FIG. 1 or to another suitable utilization device.

The prescribed word code sequence in register 219 at the end of the sequence formation mode corresponds to the five-word predetermined sequence, "How much is the fare". This sequence is the spoken word series applied to line 201 during the recognition mode. In accordance with the invention, the predetermined sequence in its final state having the minimum cumulative correspondence signal has been selected at the input spoken word series. The syntactic selection of the closest corresponding predetermined sequence on the basis of the state sequence array permits the correction of acoustically recognized series which otherwise may be erroneously selected on the basis of the minimum correspondence signal for each word position.

While the invention has been shown and described with reference to particular embodiments thereof, it will be understood that various modifications may be made by those skilled in the art without departing from the spirit and scope of the invention.

What is claimed is:

1. A method for recognizing a series of words as one of a set of predetermined sequences of prescribed words comprising the steps of (1) storing a set of state transition signals each representative of an initial state, a terminal state and a prescribed word linking said initial and terminal states to define the set of predetermined sequences of prescribed words, each sequence corresponding to a selected plurality of state connected prescribed words ending in a final state; (2) identifying the word positions of said series; (3) storing a set of signals representative of the final states of said predetermined sequences as addressed by said identified word positions; (4) generating a set of signals representative of a correspondence between the series word in each identified word position and said prescribed words; (5) assigning a time interval to each identified word position of said series; (6) in each identified word position interval, producing a cumulative correspondence signal for the identified word position of each sequence including selecting the word position correspondence signal associated with each sequence state transition signal prescribed word responsive to the sequence state transition signal in said identified word position, and combining said identified word position selected correspondence signal for each sequence with the sequence selected correspondence signals of the preceding word positions; (7) upon termination of the last word position interval selecting the sequences in their final states in said last word position responsive to the stored last word position final state signals, and (8) identifying the selected sequence having the closest cumulative correspondence to said series responsive to the last word position cumulative correspondence signals of said selected sequences.

2. A method for recognizing a series of words as one of a set of predetermined sequences of prescribed words according to claim 1 further comprising storing the initial state and prescribed word of each word position sequence state transition signal addressed by the state transition signal terminal state; and wherein said sequence identifying step comprises identifying the final state of the selected sequence having the minimum last word position cumulative correspondence signal; and forming a signal representative of the identified sequence from said stored prescribed words responsive to the identified sequence final state and the stored initial states.

3. A method for recognizing a series of words as one of a set of predetermined sequences of prescribed words according to claim 2 wherein said series of words is a series of spoken words, and said correspondence signal generation comprises generating a set of signals for each word position representative of the acoustic similarity between the spoken word of said word position and the prescribed words.

4. A method for recognizing a series of spoken words as one of a set of predetermined sequences of prescribed words comprising the steps of (1) storing a set of state transition signals each representative of an initial state, a terminal state, and the prescribed word linking said initial and terminal states to define the set of predetermined sequences, each sequence corresponding to a selected plurality of state connected prescribed words ending in a final state; (2) identifying the word positions of said spoken word series; (3) storing a set of signals representative of the final states of said predetermined sequences as addressed by said identified word positions; (4) generating a set of signals for each spoken word position representative of the acoustic correspondence between the spoken word of said identified word position and the prescribed words; (5) assigning a time interval to each spoken word position; (6) forming a cumulative correspondence signal for each sequence in each word position including selecting the word position correspondence signal associated with the sequence state transition signal prescribed word responsive to each sequence state transition signal, and adding the sequence word position selected correspondence signal to the immediately preceding word position cumulative correspondence signals for said sequence; (7) upon termination of the last word position interval, selecting the sequences in their final states in said last word position responsive to said stored last word position final state signals; and (8) identifying the selected sequence having the closest cumulative correspondence to said spoken word series responsive to the last word position cumulative correspondence signals of the selected sequences.

5. A method for recognizing a series of spoken words as one of a set of predetermined sequences of prescribed words according to claim 4 further comprising storing the initial state and prescribed word of each sequence state transition signal addressed by the sequence state transition signal terminal state in said word position; and wherein said selected sequences identification further comprises identifying the final state of the selected sequence having the minimum last word position cumulative correspondence signal; and forming a signal comprising the prescribed words of said identified sequence from said stored prescribed words responsive to said identified final state and said stored initial states.

6. A syntactic analyzer for recognizing a series of words as one of a set of syntactically allowable sequences of prescribed words comprising means for storing a set of first signals each including an initial state code, a terminal state code and a prescribed word code linking said initial and terminal state codes, which signals define a set of predetermined syntactically allowable sequences, each sequence corresponding to a selected plurality of state connected prescribed words ending in a final state; means for generating a signal identifying the word positions of said series; means for storing a set of signals representative of the final states of said sequences addressed by said identified word positions; means for generating a set of second signals representative of the similarity between each identified position word and said prescribed words; means responsive to said word position identifying signal for assigning a time interval to each word position of said series; means operative in each word position interval for producing a third signal representative of the word position cumulative similarity of each syntactically allowable sequence to said word series including means responsive to each sequence first signal for selecting the word position second signal associated with said sequence first signal prescribed word code, and means for combining the sequence selected word position second signal and the sequence selected second signals of the preceding word positions; means operative upon termination of the last word position of said series responsive to the last word position stored final state signals for selecting the sequences in their final states in said series last word position; and means responsive to said last word position third signals for identifying the selected syntactically allowable sequence having the closest cumulative similarity to said word series.

7. A syntactic analyzer for recognizing a series of words as one of a set of syntactically allowable sequences of prescribed words according to claim 6 wherein said combining means comprises means for adding the sequence word position selected second signal and the preceding word position third signal for said sequence to produce the word position third signal for said sequence.

8. A syntactic analyzer for recognizing a series of words as one of a set of syntactically allowable sequences of prescribed words according to claim 7 further comprising means operative in each word position interval responsive to each word position sequence first signal for storing the initial state code and the prescribed word code of said sequence first signal, and wherein said sequence identifying means comprises means responsive to the third signals of the selected sequences for identifying the final state of the selected sequence having the minimum last word position third signal, and means responsive to said identified final state and the stored initial state codes for forming a signal representative of the identified sequence from said stored prescribed words.

9. A syntactic analyzer for recognizing a series of words as one of a set of syntactically allowable sequences of prescribed words according to claim 8 wherein said series of words is a series of spoken words and said second signal generating means comprises means operative for each spoken word position of said series for generating a set of second signals representative of the acoustic similarity between said position spoken word and said prescribed words.

10. A speech analyzer for recognizing a series of spoken words as one of a set of predetermined sequences of prescribed words comprising means for storing a set of first signals each including an initial state code, a terminal state code and a prescribed word code linking said initial and terminal state codes to define the set of predetermined sequences of prescribed words; each predetermined sequence corresponding to a selected plurality of state linked first signals beginning in a common starting state and ending in a final state; means for generating a signal identifying the word positions of said series; means for storing a set of signals representative of the final states of said predetermined sequences as addressed by said identified word positions; means for generating a set of second signals representative of the correspondence between each identified position word and said prescribed words; means responsive to said word position identifying signal for assigning a time interval to each identified word position; means operative in each word position time interval jointly responsive to the set of first signals and said word position second signals for forming a third signal representative of the cumulative correspondence of each sequence in said word position; means operative upon termination of the last word position time interval responsive to the stored last word position final state signals for selecting the predetermined sequences in their final states in said last word position; and means responsive to the third signals of the selected sequences for identifying the selected sequence having the closest cumulative correspondence to said spoken word series.

11. A speech analyzer for recognizing a series of spoken words as one of a set of predetermined sequences of prescribed words according to claim 10 wherein said cumulative correspondence signal forming means comprises first register means addressed by said first signal initial states for storing the third signals of said sequences at the beginning of each word position time interval; second register means addressed by the first signal terminal states for storing the third signals of said sequences at the end of each word position interval, said starting state position of said first register means being initially set to a first code, all other state positions of said first and second register means being initially set to a selected largest number code, means operative in each word position interval responsive to each first signal for selecting the word position second signal associated with said first signal prescribed word; means for adding said selected word position second signal to the signal in the position of said first register means addressed by said first signal initial state; means for comparing the signal from said adding means to the signal in said second register means addressed by said first signal terminal state; means responsive to said signal from said adding means being less than the signal from said second register means for inserting said adding means signal into the position of said second register means addressed by the first signal terminal state as the word position third signal of the sequence ending in said first signal terminal state, means addressed by said first signal terminal state for storing the first signal initial state and prescribed word, and means for transferring the word position third signals in said second register means at the end of said word position time interval to said first register means and for setting each second register means position to said selected largest number code upon termination of said transfer.

12. A speech analyzer for recognizing a series of spoken words as one of a set of predetermined sequences of prescribed words according to claim 11 wherein said predetermined sequence identifying means further comprises means operative upon the termination of said last word position time interval responsive to the last word position third signals for identifying the final state of the selected sequence having the minimum third signal, and means responsive to the identified final state and the stored initial states for forming a signal representative of the predetermined sequence corresponding to said identified final state from said stored prescribed words.

13. Apparatus for recognizing a series of words comprising, means for generating a set of state transition signals each representative of an initial state, a terminal state and a prescribed word connected between said initial and terminal states to define a set of predetermined sequences of prescribed words, each sequence corresponding to a selected plurality of state connected prescribed words ending in a final state; means for generating a signal to identify the word positions of said series; means responsive to said word position identifying signal for generating a set of signals representative of the final states of said predetermined sequences as addressed by said identified word positions; means for generating a set of signals representative of the correspondence between the word of each identified position of the series and the prescribed words; means operative for each identified word position for forming a cumulative correspondence signal for each sequence in each word position including means responsive to said word position identifying signal for assigning a time interval to each identified word position, means operative in each word position interval responsive to each sequence state transition signal for selecting the correspondence signal associated with the sequence state transition signal prescribed word, and means for combining said sequence word position selected correspondence signal with the sequence selected correspondence signals of the preceding word positions; means operative upon termination of the last identified word position interval responsive to said generated last word position final states for selecting the sequences in their final states in said last word position; and means responsive to the cumulative correspondence signals of the selected sequences for identifying the selected sequence having the closest cumulative correspondence to said series of words.

14. Apparatus for recognizing a series of words according to claim 13 further comprising means operative in each word position time interval for storing the prescribed word of each sequence state transition signal and wherein said selected sequence identifying means further comprises means for producing the selected sequence in its final state having the closest cumulative correspondence to said word series from said stored prescribed words.

15. Apparatus for recognizing a series of words according to claim 4 wherein said series of words is a series of unknown spoken words, and wherein said correspondence signal generating means comprises means for generating a set of signals representative of the acoustic similarity between each word position spoken word and said prescribed words.

16. Apparatus for recognizing a series of spoken words comprising means for storing a set of state transition signals each representative of an initial state, a terminal state, and the prescribed word connected from said initial state to said terminal state to define a set of predetermined sequences of prescribed words, each sequence corresponding to a selected plurality of state connected prescribed words ending in a final state; means for generating a signal identifying the word positions of said series; means for storing a set of signals respresentative of the final states of said predetermined sequences as addressed by said identified word position; means for generating a set of signals representative of the accoustic correspondence between each identified position spoken word and the prescribed words of the stored state transition signals; means responsive to said word identifying signal for assigning a time interval to each identified spoken word position; means operative in each identified word position interval for forming a cumulative correspondence signal for each predetermined sequence including means responsive to the state transition signal of each sequence for selecting the correspondence signal associated with the prescribed word of the sequence state transition signal, and means for combining said sequence word position selected correspondence signal with the prior word position correspondence signals for the sequence; means operative in each word position time interval for storing each sequence state transition signal prescribed word; and means operative upon termination of the last word position interval responsive to said last word position stored final state signals for selecting the sequences in their final states in said last word position; and means responsive to the cumulative correspondence signals of the selected sequences for identifying the selected sequence having the minimum cumulative correspondence signal as the series of spoken words.

17. Apparatus for recognizing a series of spoken words according to claim 6 wherein said cumulative correspondence signal forming means comprises means operative prior to the first word position interval for forming an initial cumulative correspondence signal for each sequence, means operative in each word position interval responsive to each sequence state transition signal for selecting the correspondence signal associated with the sequence state transition signal prescribed word, and means for adding the sequence cumulative correspondence signal of the immediately preceding word position interval and said word position sequence selected correspondence signal to form the word position cumulative correspondence signal of the sequence.

18. Apparatus for recognizing a series of spoken words according to claim 17 wherein said sequence identifying means further comprises means responsive to the stored prescribed words of said identified sequence in its final state for forming a signal representative of said identified sequence.

19. A word recognizer for identifying a series of spoken words comprising first means for storing a set of state transition signals each representative of an initial state, a terminal state and the prescribed word linking said initial and terminal states to define a set of predetermined sequences of prescribed words, each predetermined sequence being represented by a selected plurality of linked state transition signals ending in a final state, all predetermined sequences beginning in a common starting state, means for generating a signal identifying the word positions of said series of spoken words; means for storing a set of signals representative of the final states of the predetermined sequences as addressed by said identified word positions; means responsive to each identified spoken word position of said series for generating a set of signals representative of the correspondence between the spoken word in said position and said prescribed words; second means for storing each corresponding signal addressed by word position and prescribed word; means responsive to said identifying signal for assigning a time interval to each identified word position of said series; means operative in each identified word position interval jointly responsive to said state transition signals and said stored correspondence signals for forming a cumulative correspondence signal for each sequence in each word position including means responsive to each sequence state transition signal for adding the stored correspondence signal addressed by the sequence state transition signal prescribed word from said first storing means and the identified word position to the sequence cumulative correspondence signal of the immediately preceding word position to produce a cumulative correspondence signal for the word position of the sequence; third means operative in each identified word position interval responsive to each sequence state transition signal for storing the sequence state transition signal initial state and prescribed word addressed by the state transition signal terminal state and word position; and means operative upon termination of the last word position interval for producing the predetermined sequence in its final state in said last word position having the closest cumulative correspondence to said spoken word series comprising means responsive to said stored final state signals of said last word position for selecting the sequences in their final states in said last word position; means responsive to said selected sequences for identifying the final state of the selected sequence having the minimum last word position cumulative correspondence signal; and means jointly responsive to said identified final state and said third storing means initial states for retrieving the prescribed words of said closest corresponding selected sequence from said third storing means, and for forming a signal representative of said closest corresponding selected sequence.

* * * * *

UNITED STATES PATENT AND TRADEMARK OFFICE
CERTIFICATE OF CORRECTION

PATENT NO. : 4,156,868

DATED : May 29, 1979

INVENTOR(S) : Stephen E. Levinson

It is certified that error appears in the above-identified patent and that said Letters Patent are hereby corrected as shown below:

Column 2, line 11, "a" should read --to--. Column 5, line 40, that portion of the formula "$(\hat{W})$" should read --$(\hat{W})$--; "$V_T,$" should read --$\bar{V}_T;$--. Column 6, line 53, "$\bar{w}$" should read --$\tilde{w}$--. Column 9, line 18, "fo" should read --of--. Column 11, line 6, "$w_j$" should read --$\bar{w}_j$--. Column 15, line 32, "b2" should read --2--. Column 18, line 4, "$c_1$" should read --$C_1$--. Column 21, line 7, "of store" should read --of correspondence store--. Column 22, line 23, "ANd" should read --AND--; line 60, "FIg" should read --FIG--. Column 23, line 22, "2B9" should read --2B)--; line 29, "272B" should read --273B--; line 32, "N=6" should read --M=6--; line 37, "$w_2$" should read --$\bar{w}_2$--; line 38, "$w_5$" should read --$\hat{w}_5$--; line 43, "$w_5=w_2$" should read --$\hat{w}_5=\bar{w}_2$--; line 53, "$w_{15}$" should read --$\bar{w}_{15}$--; line 54, "$w_4$" should read --$\hat{w}_4$--; line 56, "ANd" should read --AND--; line 60, "$w_1$" should read --$\bar{w}_1$--; line 62, "$w_3$" should read --$\hat{w}_3$--; line 66, "$w_{27}$"

UNITED STATES PATENT AND TRADEMARK OFFICE
CERTIFICATE OF CORRECTION

PATENT NO. : 4,156,868

DATED : May 29, 1979

INVENTOR(S) : Stephen E. Levinson

It is certified that error appears in the above-identified patent and that said Letters Patent are hereby corrected as shown below:

should read $--\bar{w}_{27}--$; line 68, "$w_2$" should read $--\hat{w}_2--$. Column 24 line 4, "$w_{26}$" should read $--\bar{w}_{26}--$; line 6, "$w_1$" should read $--\hat{w}_1--$; line 11, "$W=W_5, w_4, w_3, w_2, w_1$" should read $--\hat{W}=\hat{w}_5, \hat{w}_4, \hat{w}_3, \hat{w}_2, \hat{w}_1--$. Column 28, line 63, "claim 4" should read --claim 14 --.

Signed and Sealed this

Eleventh Day of March 1980

[SEAL]

Attest:

SIDNEY A. DIAMOND

Attesting Officer

Commissioner of Patents and Trademarks